(12) United States Patent
Zhang et al.

(10) Patent No.: US 12,276,759 B2
(45) Date of Patent: Apr. 15, 2025

(54) LiDAR SYSTEMS AND METHODS FOR FOCUSING ON RANGES OF INTEREST

(71) Applicant: Innovusion, Inc., Sunnyvale, CA (US)

(72) Inventors: Rui Zhang, Palo Alto, CA (US); Yimin Li, Cupertino, CA (US); Junwei Bao, Los Altos, CA (US); Jason Ferns, Sunnyvale, CA (US)

(73) Assignee: SEYOND, INC., Sunnyvale, CA (US)

( * ) Notice: Subject to any disclaimer, the term of this patent is extended or adjusted under 35 U.S.C. 154(b) by 0 days.

(21) Appl. No.: 18/223,490

(22) Filed: Jul. 18, 2023

(65) Prior Publication Data

US 2023/0375676 A1 Nov. 23, 2023

Related U.S. Application Data

(63) Continuation of application No. 17/530,370, filed on Nov. 18, 2021, now Pat. No. 11,860,313, which is a continuation of application No. 16/439,230, filed on Jun. 12, 2019, now Pat. No. 11,675,053.

(60) Provisional application No. 62/685,333, filed on Jun. 15, 2018.

(51) Int. Cl.
| | |
|---|---|
| *G01S 7/481* | (2006.01) |
| *G01S 7/484* | (2006.01) |
| *G01S 17/10* | (2020.01) |
| *G02B 26/08* | (2006.01) |
| *G02B 26/10* | (2006.01) |
| *G02B 26/12* | (2006.01) |

(52) U.S. Cl.
CPC ............ *G01S 7/4817* (2013.01); *G01S 7/484* (2013.01); *G01S 17/10* (2013.01); *G02B 26/0816* (2013.01); *G02B 26/10* (2013.01); *G02B 26/12* (2013.01)

(58) Field of Classification Search
CPC ...... G01S 7/4814; G01S 7/4817; G01S 7/484; G01S 17/10; G02B 5/09; G02B 5/10; G02B 26/0816; G02B 26/10; G02B 26/12; G02B 26/105; G02B 26/126
See application file for complete search history.

(56) References Cited

U.S. PATENT DOCUMENTS

| | | | |
|---|---|---|---|
| 3,897,150 | A | 7/1975 | Bridges et al. |
| 4,412,720 | A | 11/1983 | Costa |
| 4,484,048 | A | 8/1984 | Farlow |

(Continued)

FOREIGN PATENT DOCUMENTS

| | | | |
|---|---|---|---|
| CN | 1677050 | A | 10/2006 |
| CN | 102084281 | A | 6/2011 |

(Continued)

OTHER PUBLICATIONS

Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Yuqing Xiao
*Assistant Examiner* — Benjamin Richard Hebert
(74) *Attorney, Agent, or Firm* — MASCHOFF BRENNAN; Liang Huang

(57) ABSTRACT

Embodiments discussed herein refer to LiDAR systems to focus on one or more regions of interests within a field of view.

14 Claims, 33 Drawing Sheets

(56) References Cited

U.S. PATENT DOCUMENTS

| | | |
|---|---|---|
| 4,923,263 A | 5/1990 | Johnson |
| 5,006,721 A | 4/1991 | Cameron et al. |
| 5,157,451 A | 10/1992 | Taboada et al. |
| 5,303,084 A | 4/1994 | Pflibsen et al. |
| 5,319,434 A | 8/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | DeAngelis et al. |
| 5,736,756 A | 4/1998 | Wakayama et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,175,440 B1 | 1/2001 | Conemac |
| 6,317,202 B1 | 11/2001 | Hosokawa et al. |
| 6,501,586 B1 | 12/2002 | Takayama |
| 6,594,000 B2 | 7/2003 | Green et al. |
| 6,650,404 B1 | 11/2003 | Crawford |
| 6,788,445 B2 | 9/2004 | Goldberg et al. |
| 6,788,861 B1 | 9/2004 | Utsui et al. |
| 6,950,733 B2 | 9/2005 | Stopczynski |
| 7,128,267 B2 | 10/2006 | Reichenbach et al. |
| 7,202,841 B2 | 4/2007 | Munro |
| 7,345,271 B2 | 3/2008 | Boehlau et al. |
| 7,382,442 B2 | 6/2008 | Adachi et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,583,364 B1 | 9/2009 | Mayor et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,984,928 B2 | 3/2015 | Shiraishi |
| 9,041,762 B2 | 5/2015 | Bal et al. |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,368,936 B1 | 6/2016 | Lenius et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,821,876 B2 | 4/2017 | Federspiel |
| 9,638,799 B2 | 5/2017 | Goodwin et al. |
| 9,696,426 B2 | 7/2017 | Zuk et al. |
| 9,702,986 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | van Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,646 B2 | 5/2018 | Eichenholz et al. |
| 9,989,629 B1 | 6/2018 | LaChapelle |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,296,656 B2 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,598,790 B2 | 3/2020 | Rubin |
| 10,627,491 B2 | 4/2020 | Hall et al. |
| 10,641,872 B2 | 5/2020 | Dussan et al. |
| 10,663,596 B2 | 5/2020 | Dussan et al. |
| 10,663,664 B2 | 5/2020 | LaChapelle |
| 10,863,585 B2 | 5/2020 | McWhirter |
| 10,684,360 B2 | 6/2020 | Campbell |
| 10,732,281 B2 | 8/2020 | LaChapelle |
| 10,768,304 B2 | 9/2020 | Englard et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,016,192 B2 | 5/2021 | Pacala et al. |
| 11,176,405 B2 | 11/2021 | Pacala et al. |
| 11,178,381 B2 | 11/2021 | Pacala et al. |
| 11,194,048 B1 | 12/2021 | Burbank et al. |
| 11,287,515 B2 | 3/2022 | Pacala et al. |
| 11,422,236 B2 | 8/2022 | Pacala et al. |
| 2002/0136251 A1 | 9/2002 | Green et al. |
| 2004/0135992 A1 | 7/2004 | Munro |
| 2004/0222366 A1 | 11/2004 | Frick |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2006/0209373 A1 | 9/2006 | Kato |
| 2007/0091948 A1 | 4/2007 | Di Teodoro et al. |
| 2007/0218995 A1 | 9/2007 | Bollond et al. |
| 2008/0174762 A1 | 7/2008 | Liu et al. |
| 2008/0183135 A1 | 8/2008 | Du et al. |
| 2009/0002678 A1 | 1/2009 | Tanaka et al. |
| 2009/0010844 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0091732 A1 | 4/2009 | Kato |
| 2009/0147239 A1 | 6/2009 | Zhu et al. |
| 2009/0153644 A1 | 6/2009 | Naito |
| 2009/0262780 A1 | 10/2009 | Krupkin et al. |
| 2009/0316134 A1 | 12/2009 | Michael et al. |
| 2010/0006780 A1 | 1/2010 | Lee et al. |

(56) References Cited

U.S. PATENT DOCUMENTS

| | | | |
|---|---|---|---|
| 2010/0020170 A1* | 1/2010 | Higgins-Luthman | ........................ G06V 20/56 348/135 |
| 2010/0020306 A1 | 1/2010 | Hall | |
| 2010/0020377 A1 | 1/2010 | Borchers et al. | |
| 2010/0027602 A1 | 2/2010 | Abshire et al. | |
| 2010/0045965 A1 | 2/2010 | Meneely | |
| 2010/0053715 A1* | 3/2010 | O'Neill | ................ G02B 26/105 356/3 |
| 2010/0128109 A1 | 5/2010 | Banks | |
| 2010/0271814 A1 | 10/2010 | Albuquerque et al. | |
| 2011/0063703 A1 | 3/2011 | Ishibe | |
| 2011/0181864 A1 | 7/2011 | Schmitt et al. | |
| 2012/0038903 A1 | 2/2012 | Weimer et al. | |
| 2012/0124113 A1 | 5/2012 | Zalik et al. | |
| 2012/0221142 A1 | 8/2012 | Doak | |
| 2012/0260512 A1 | 10/2012 | Kretschmer et al. | |
| 2013/0076852 A1* | 3/2013 | Bai | ........................ B41J 2/471 347/261 |
| 2013/0107016 A1 | 5/2013 | Federspiel | |
| 2013/0116971 A1 | 5/2013 | Retkowski et al. | |
| 2013/0241761 A1 | 9/2013 | Cooper et al. | |
| 2013/0293867 A1 | 11/2013 | Hsu et al. | |
| 2013/0293946 A1 | 11/2013 | Fermann et al. | |
| 2013/0329279 A1 | 12/2013 | Nati et al. | |
| 2013/0342822 A1 | 12/2013 | Shiraishi | |
| 2014/0078514 A1 | 3/2014 | Zhu | |
| 2014/0104594 A1 | 4/2014 | Gammenthaler | |
| 2014/0347650 A1 | 11/2014 | Bösch | |
| 2014/0350836 A1 | 11/2014 | Stettner et al. | |
| 2015/0078123 A1 | 3/2015 | Batcheller et al. | |
| 2015/0084805 A1 | 3/2015 | Dawber | |
| 2015/0109603 A1 | 4/2015 | Kim et al. | |
| 2015/0116892 A1 | 4/2015 | Zuk et al. | |
| 2015/0139259 A1 | 5/2015 | Robinson | |
| 2015/0158489 A1 | 6/2015 | Oh et al. | |
| 2015/0176977 A1* | 6/2015 | Abele | ................ G01B 11/2513 356/614 |
| 2015/0229912 A1 | 8/2015 | Masalkar et al. | |
| 2015/0338270 A1 | 11/2015 | Williams et al. | |
| 2015/0355327 A1 | 12/2015 | Goodwin et al. | |
| 2016/0003946 A1 | 1/2016 | Gilliland et al. | |
| 2016/0006914 A1 | 1/2016 | Neumann | |
| 2016/0047896 A1 | 2/2016 | Dussan | |
| 2016/0047900 A1 | 2/2016 | Dussan | |
| 2016/0047902 A1 | 2/2016 | Ishikawa et al. | |
| 2016/0061655 A1 | 3/2016 | Nozawa | |
| 2016/0061935 A1 | 3/2016 | McCloskey et al. | |
| 2016/0100521 A1 | 4/2016 | Halloran et al. | |
| 2016/0117048 A1 | 4/2016 | Frame et al. | |
| 2016/0172819 A1 | 6/2016 | Ogaki | |
| 2016/0178736 A1 | 6/2016 | Chung | |
| 2016/0226210 A1 | 8/2016 | Zayhowski et al. | |
| 2016/0245902 A1 | 8/2016 | Watnik | |
| 2016/0291134 A1 | 10/2016 | Droz et al. | |
| 2016/0313445 A1 | 10/2016 | Bailey et al. | |
| 2016/0327646 A1 | 11/2016 | Scheim et al. | |
| 2016/0356890 A1 | 12/2016 | Fried et al. | |
| 2017/0003116 A1 | 1/2017 | Yee et al. | |
| 2017/0153319 A1 | 6/2017 | Villeneuve et al. | |
| 2017/0242104 A1 | 8/2017 | Dussan | |
| 2017/0299721 A1 | 10/2017 | Eichenholz et al. | |
| 2017/0307738 A1 | 10/2017 | Schwarz et al. | |
| 2017/0365105 A1 | 12/2017 | Rao et al. | |
| 2018/0040171 A1 | 2/2018 | Kundu et al. | |
| 2018/0050704 A1 | 2/2018 | Tascione et al. | |
| 2018/0059221 A1* | 3/2018 | Slobodyanyuk | ...... G01S 7/4814 |
| 2018/0059248 A1 | 3/2018 | O'Keeffe | |
| 2018/0062345 A1* | 3/2018 | Bills | ........................ G01S 7/4815 |
| 2018/0069367 A1 | 3/2018 | Villeneuve et al. | |
| 2018/0113200 A1* | 4/2018 | Steinberg | ........... G02B 26/0858 |
| 2018/0152681 A1 | 5/2018 | Pacala et al. | |
| 2018/0156896 A1 | 6/2018 | O'Keeffe | |
| 2018/0158471 A1 | 6/2018 | Vaughn et al. | |
| 2018/0164439 A1 | 6/2018 | Droz et al. | |
| 2018/0188355 A1 | 7/2018 | Bao et al. | |
| 2018/0188357 A1 | 7/2018 | Li et al. | |
| 2018/0188358 A1 | 7/2018 | Li et al. | |
| 2018/0188371 A1 | 7/2018 | Bao et al. | |
| 2018/0210084 A1 | 7/2018 | Zwölfer et al. | |
| 2018/0276274 A1 | 9/2018 | Bao et al. | |
| 2018/0284234 A1* | 10/2018 | Curatu | ................ G01S 7/4817 |
| 2018/0284237 A1 | 10/2018 | Campbell et al. | |
| 2018/0284241 A1 | 10/2018 | Campbell et al. | |
| 2018/0284242 A1 | 10/2018 | Campbell | |
| 2018/0284286 A1 | 10/2018 | Eichenholz et al. | |
| 2018/0288320 A1 | 10/2018 | Tardif et al. | |
| 2018/0292532 A1 | 10/2018 | Meyers et al. | |
| 2018/0329060 A1 | 11/2018 | Pacala et al. | |
| 2018/0359460 A1 | 12/2018 | Pacala et al. | |
| 2018/0364333 A1* | 12/2018 | Jungwirth | ............. G01S 7/4814 |
| 2019/0025428 A1 | 1/2019 | Li et al. | |
| 2019/0101627 A1 | 4/2019 | Hansson et al. | |
| 2019/0101645 A1* | 4/2019 | DeMersseman | ........ G01S 17/42 |
| 2019/0107607 A1 | 4/2019 | Danziger | |
| 2019/0107623 A1* | 4/2019 | Campbell | ............. G01S 17/931 |
| 2019/0120842 A1 | 4/2019 | Zhang et al. | |
| 2019/0120962 A1 | 4/2019 | Gimpel et al. | |
| 2019/0154804 A1 | 5/2019 | Eichenholz | |
| 2019/0154807 A1 | 5/2019 | Steinkogler et al. | |
| 2019/0212416 A1 | 7/2019 | Li et al. | |
| 2019/0250254 A1 | 8/2019 | Campbell et al. | |
| 2019/0250270 A1 | 8/2019 | Suzuki et al. | |
| 2019/0257924 A1 | 8/2019 | Li et al. | |
| 2019/0265334 A1 | 8/2019 | Zhang et al. | |
| 2019/0265336 A1 | 8/2019 | Zhang et al. | |
| 2019/0265337 A1 | 8/2019 | Zhang et al. | |
| 2019/0265339 A1 | 8/2019 | Zhang et al. | |
| 2019/0277952 A1 | 9/2019 | Beuschel et al. | |
| 2019/0310351 A1* | 10/2019 | Hughes | ................ G02B 26/101 |
| 2019/0310368 A1* | 10/2019 | LaChapelle | ............. G01S 17/08 |
| 2019/0369215 A1 | 12/2019 | Wang et al. | |
| 2019/0369258 A1 | 12/2019 | Hall et al. | |
| 2019/0383915 A1 | 12/2019 | Li et al. | |
| 2020/0033450 A1* | 1/2020 | Zhang | ................... G01S 7/4815 |
| 2020/0142070 A1 | 5/2020 | Hall et al. | |
| 2020/0256984 A1 | 8/2020 | Campbell et al. | |
| 2020/0284906 A1 | 9/2020 | Eichenholz et al. | |
| 2020/0319310 A1 | 10/2020 | Hall et al. | |
| 2020/0400798 A1 | 12/2020 | Rezk et al. | |
| 2021/0088830 A1 | 3/2021 | Zhang | |

FOREIGN PATENT DOCUMENTS

| | | |
|---|---|---|
| CN | 202748802 U | 2/2013 |
| CN | 103403577 A | 11/2013 |
| CN | 104034258 A | 9/2014 |
| CN | 204758260 U | 11/2015 |
| CN | 204885804 U | 12/2015 |
| CN | 107407722 A | 11/2017 |
| CN | 108051868 A | 5/2018 |
| CN | 108132472 A | 6/2018 |
| CN | 207457508 U | 6/2018 |
| CN | 207557465 U | 6/2018 |
| CN | 108450025 A | 8/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |

(56) References Cited

FOREIGN PATENT DOCUMENTS

| | | |
|---|---|---|
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 4142702 A1 | 6/1993 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2 000 411 A | 1/1979 |
| JP | S628119 A | 1/1987 |
| JP | H0683998 A | 3/1994 |
| JP | H11194018 A | 7/1999 |
| JP | 2007144667 A | 6/2007 |
| JP | 2008298520 A | 12/2008 |
| JP | 2009121836 A | 6/2009 |
| JP | 2010035385 A | 2/2010 |
| JP | 2014115182 A | 6/2014 |
| JP | 2018040662 A | 3/2016 |
| JP | 2017003347 A | 1/2017 |
| JP | 2017138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 9816801 A1 | 4/1998 |
| WO | 2012040749 A1 | 4/2012 |
| WO | 2017/110417 A1 | 6/2017 |
| WO | 2017/112416 A1 | 6/2017 |
| WO | 2016056545 A1 | 4/2018 |
| WO | 2018/125725 A1 | 7/2018 |
| WO | 2018/129408 A1 | 7/2018 |
| WO | 2018/129409 A1 | 7/2018 |
| WO | 2018/129410 A1 | 7/2018 |
| WO | 2018126248 A1 | 7/2018 |
| WO | 2018/175990 A1 | 9/2018 |
| WO | 2018/182812 A2 | 10/2018 |
| WO | 2019/079642 A1 | 4/2019 |
| WO | 2019/165095 A1 | 8/2019 |
| WO | 2019/165289 A1 | 8/2019 |
| WO | 2019/165294 A1 | 8/2019 |
| WO | 2020/013890 A2 | 1/2020 |

OTHER PUBLICATIONS

European Search Report, dated Jul. 17, 2020, for EP Application No. 18776977.3, 12 pages.
European Search Report, dated Jun. 17, 2021, for EP Application No. 18868896.4, 7 pages.
Extended European Search Report, dated Jul. 10, 2020, for EP Application No. 18736738.8, 9 pages.
Extended European Search Report, dated Jul. 22, 2020, for EP Application No. 18736685.1, 10 pages.
Fiber laser, Wikipedia, https://en.wikipedia.org/wiki/Fiber_laser, 6 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
International Preliminary Report on Patentability, dated Apr. 30, 2020, for International Application No. PCT/US2018/056577, 8 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jan. 3, 2019, for International Application No. PCT/US2018/056577, 15 pages.
International Search Report and Written Opinion, dated Jul. 9, 2019, for International Application No. PCT/US2019/018987, 17 pages.
International Search Report and Written Opinion, dated Jun. 7, 2018, for International Application No. PCT/US2018/024185, 9 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion, dated Mar. 23, 2018, for International Application No. PCT/US2018/012704, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Sep. 18, 2018, for International Application No. PCT/US2018/012116, 12 pages.
Mirrors, Physics LibreTexts, https://phys.libretexts.org/Bookshelves/Optics/Supplemental_Modules_(Components)/ Mirrors, (2021), 2 pages.
Office Action Issued in Japanese Patent Application No. 2018-536019 dated Nov. 30, 2021, 6 pages.
"Why Wavelengths Matter in Fiber Optics", FirstLight, https://www.firstlight.net/why-wavelengths-matter-in-fiber-optics/, (2021), 5 pages.
Vuthea et al., "A Design of Risley Scanner for LiDAR Applications," 2018 International Conference on Optical MEMS and Nanophotonics (OMN), pp. 135-136.
Notice of Allowance issued in Korean Patent Application No. 10-2021-7041437 dated Apr. 28, 2022, 6 pages.
International Search Report and Written Opinion, dated Oct. 11, 2019, for International Application No. PCT/US2019/036779, 15 pages.
First Office Action issued in Chinese Application No. 201980052559.X dated Jan. 31, 2024, 12 pages.
Office Action received for Chinese Patent Application No. 202111403661.5, mailed on Nov. 20, 2024, 16 pages (9 pages of English Translation and 7 pages of Original Document).

\* cited by examiner

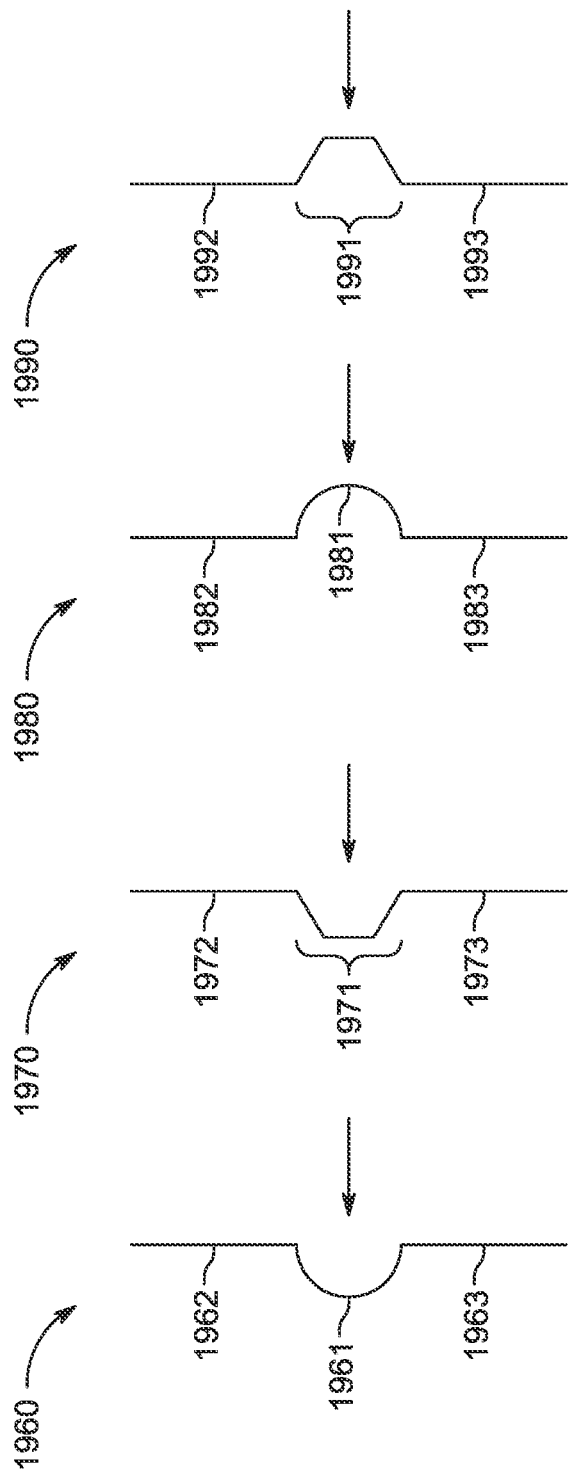

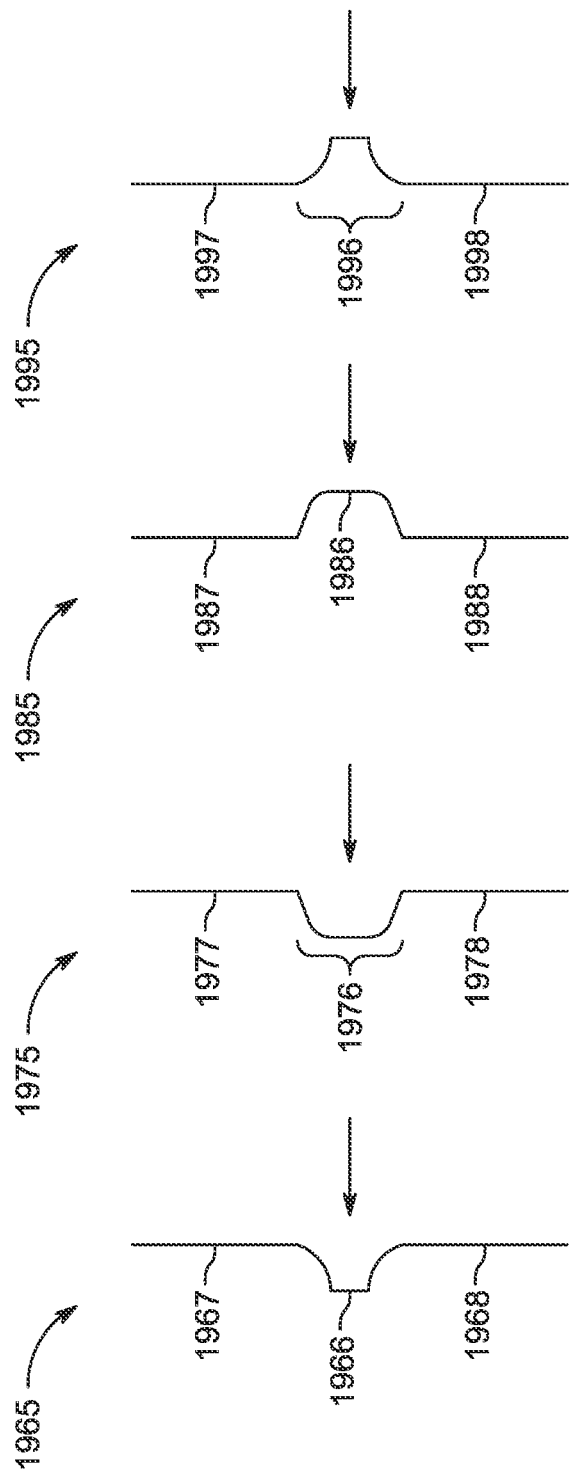

LiDAR SYSTEMS AND METHODS FOR FOCUSING ON RANGES OF INTEREST

CROSS-REFERENCE TO A RELATED APPLICATION

This application is a continuation of U.S. application Ser. No. 17/530,370, filed Nov. 18, 2021, which is a continuation of U.S. application Ser. No. 16/439,230, filed Jun. 12, 2019, now U.S. Pat. No. 11,675,053, which claims the benefit of U.S. Provisional Application No. 62/685,333, filed Jun. 15, 2018. The entire contents of these applications are hereby incorporated herein by reference. This application is related to U.S. application Ser. No. 16/242,534, entitled "LIDAR DETECTION SYSTEMS AND METHODS," filed on Jan. 8, 2019, now U.S. Pat. No. 11,675,050, and U.S. application Ser. No. 16/242,567, entitled "LIDAR DETECTION SYSTEMS AND METHODS THAT USE MULTI-PLANE MIRRORS," filed on Jan. 8, 2019.

FIELD OF THE INVENTION

The present disclosure relates generally to laser scanning and, more particularly, to using a laser scanning system to focus on one or more ranges of interest within a field of view.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Light detection and ranging (LiDAR) systems, for example, can provide the sensory input required by a semi-autonomous or fully autonomous vehicle. LiDAR systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment.

BRIEF SUMMARY

Embodiments discussed herein refer to using LiDAR systems and methods to focus on one or more regions of interests within a field of view. A region of interest may occupy a particular portion of the field of view that requires additional data or scanning resolution compared to regions that are not of interest. The LiDAR systems and methods discussed herein are able to adjust one or more factors within each field of view scanning sequence to increase data collection from the one or more regions of interest during each scan.

A further understanding of the nature and advantages of the embodiments discussed herein may be realized by reference to the remaining portions of the specification and the drawings.

BRIEF DESCRIPTION OF THE DRAWINGS

FIGS. 19A-19J show illustrative mirrors according to various embodiments.

DETAILED DESCRIPTION

Figure 1:
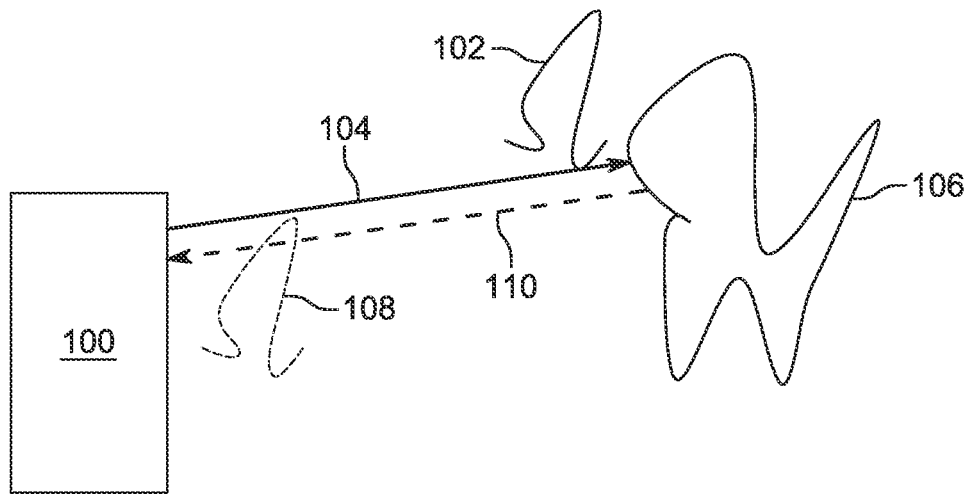
FIGS. 1-3 illustrate an exemplary LiDAR system using pulse signal to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area) or the field of view. When these systems use mechanical means to direct the pulses, the system complexity increases because more moving parts are required.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
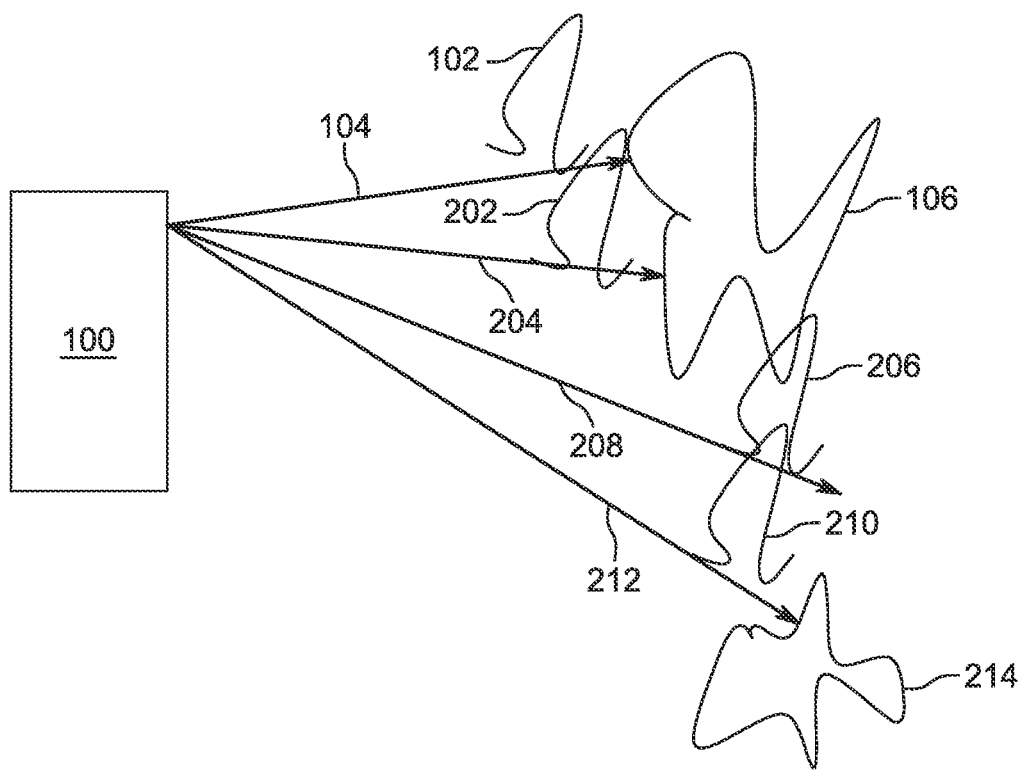
Figure 3:
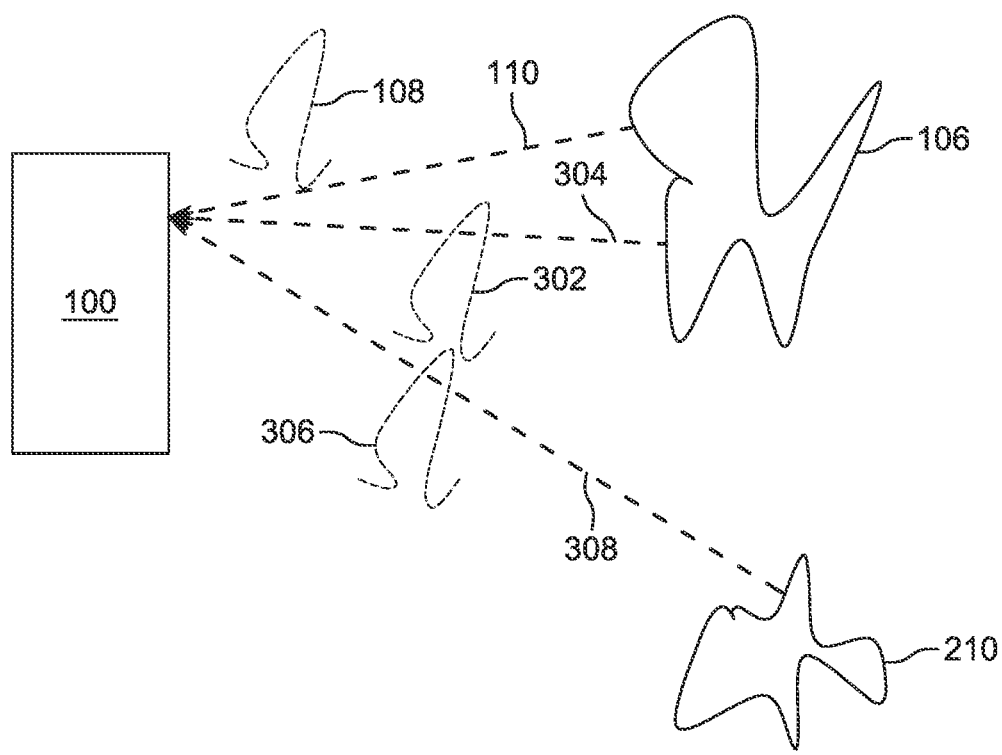

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
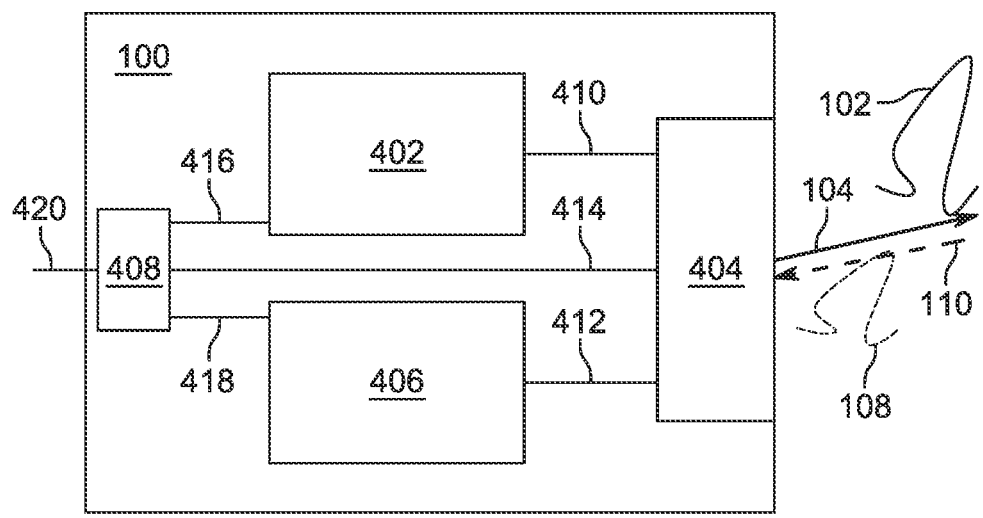
FIG. 4 depicts a logical block diagram of the exemplary LiDAR system.

FIG. 4 depicts a logical block diagram of LiDAR system 100, which includes light source 402, signal steering system 404, light detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
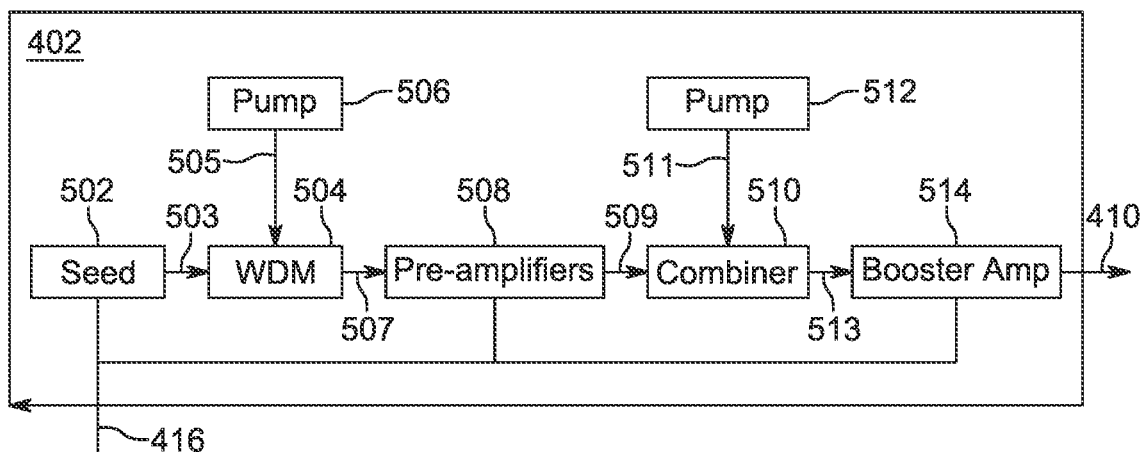
FIG. 5 depicts a light source of the exemplary LiDAR system.

FIG. 5 depicts a logical block diagram of one example of light source 402 that is based on a fiber laser, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided via fiber 507 to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. Patent Application Publication No. 2018/0188355, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
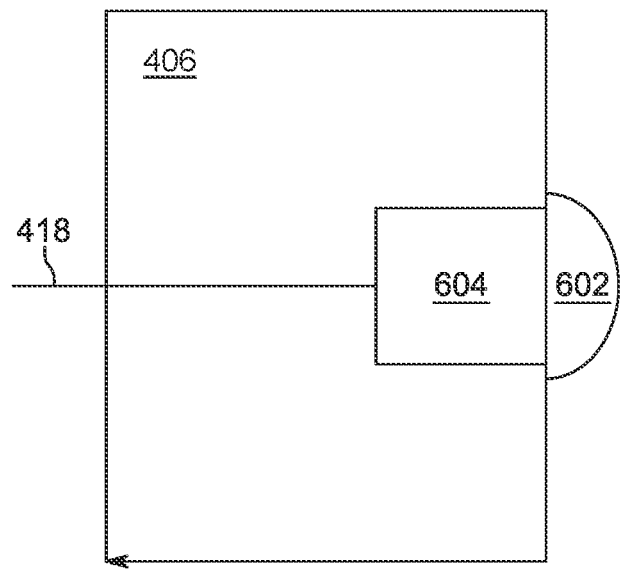
FIG. 6 depicts a light detector of the exemplary LiDAR system.

FIG. 6 depicts a logical block diagram of one possible arrangement of components in light detector 406 of LiDAR system 100 (FIG. 4). Light detector 406 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 406 can include filters to selectively pass light of certain wavelengths. Light detector 406 can also include a timing circuit that measures the time from when a pulse is transmitted to when a corresponding returned pulse is detected. This data can then be transmitted to controller 408 (FIG. 4) or to other devices via communication line 418. Light detector 406 can also receive information about when light source 402 transmitted a light pulse via communication line 418 or other communications lines that are not shown (e.g., an optical fiber from light source 402 that samples transmitted light pulses). Alternatively, light detector 406 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
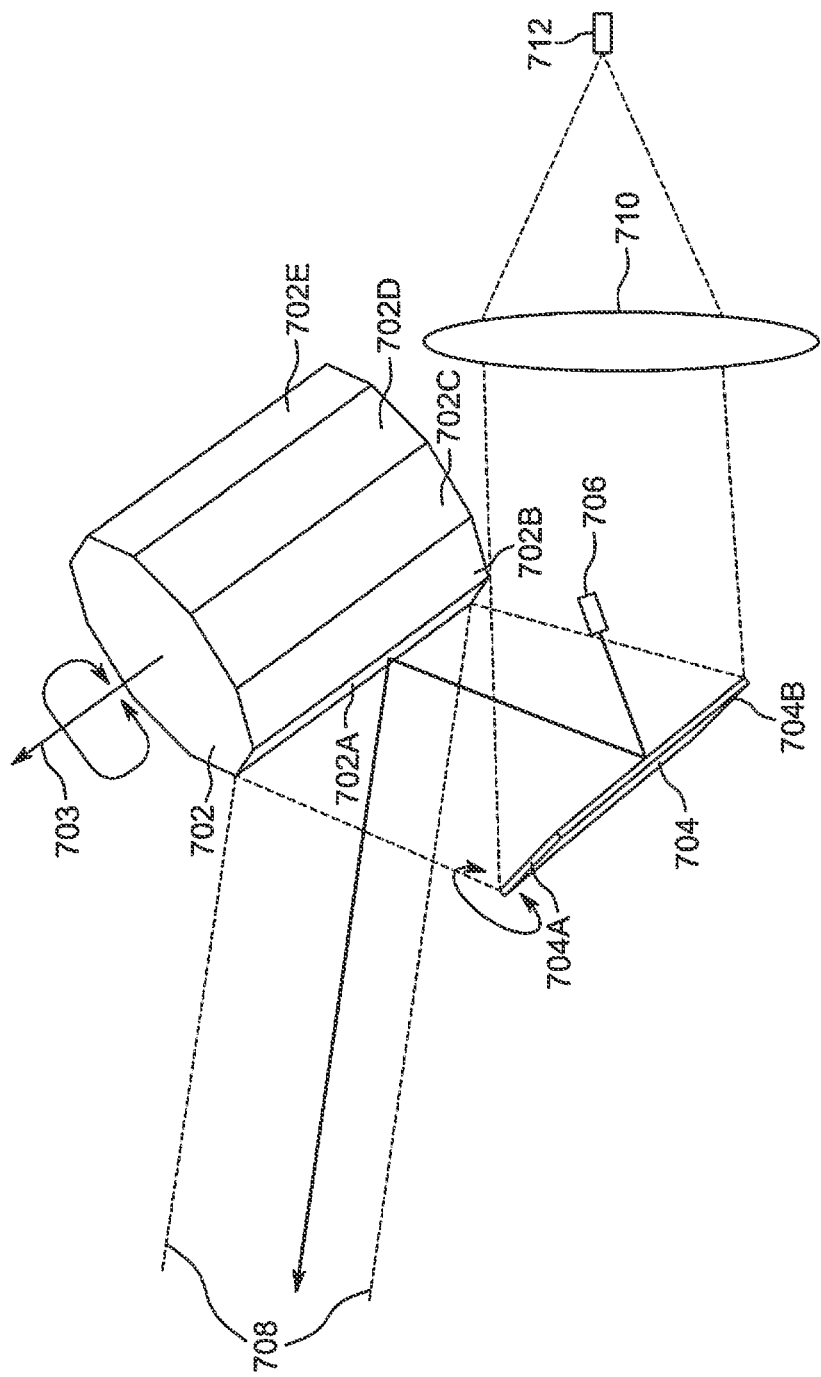
FIG. 7 depicts an embodiment of a signal steering system using a single light source and detector.

FIG. 7 depicts an embodiment of a signal steering system (e.g., signal steering system 404 of FIG. 4) according to some embodiments of the present technology. Polygon 702 has ten reflective sides (sides 702A-702E are visible in FIG. 7) but can have any number of reflective sides. For example, other examples of polygon 702 has 6, 8, or 20 sides). Polygon 702 rotates about axis 703 based on a drive motor (not shown) to scan signals delivered from a light source (e.g., via output 706, which is connected to a light source such as light source 402 described above) along a direction perpendicular or at a non-zero angle to axis of rotation 703.

Mirror galvanometer 704 is positioned next to polygon 702 so that one or more signals emitted from light source output 706 (e.g., a fiber tip) reflect off of mirror galvanometer 704 and onto rotating polygon 702. Mirror galvanometer 704 tilts so as to scan one or more signals from output 706 to a direction different than the direction that polygon 702 scans signals (e.g., edges 704A and 704B tilt towards and away from polygon 702 about axis so as to scan pulses along a path that is parallel or at an angle to the axis of rotation of polygon 702). In some examples, polygon 702 is responsible for scanning one or more signals in the horizontal direction of the LiDAR system and mirror galvanometer 704 is responsible for scanning one or more signals in the vertical direction. In some other examples, polygon 702 and mirror galvanometer 704 are configured in the reverse manner. While the example in FIG. 7 uses a mirror galvanometer, other components can be used in its place. For example, one or more rotating mirrors or a grating (with different wavelength pulses) may be used. The solid black line represents one example signal path through the signal steering system.

Light returned from signal scattering (e.g., when a light hits an object) within region 708 (indicated by dashed lines) is returned to rotating polygon 702, reflected back to mirror galvanometer 704, and focused by lens 710 onto detector 712. While lens 710 is depicted as a single lens, in some variations it is a system of one or more optics.

Figure 8:
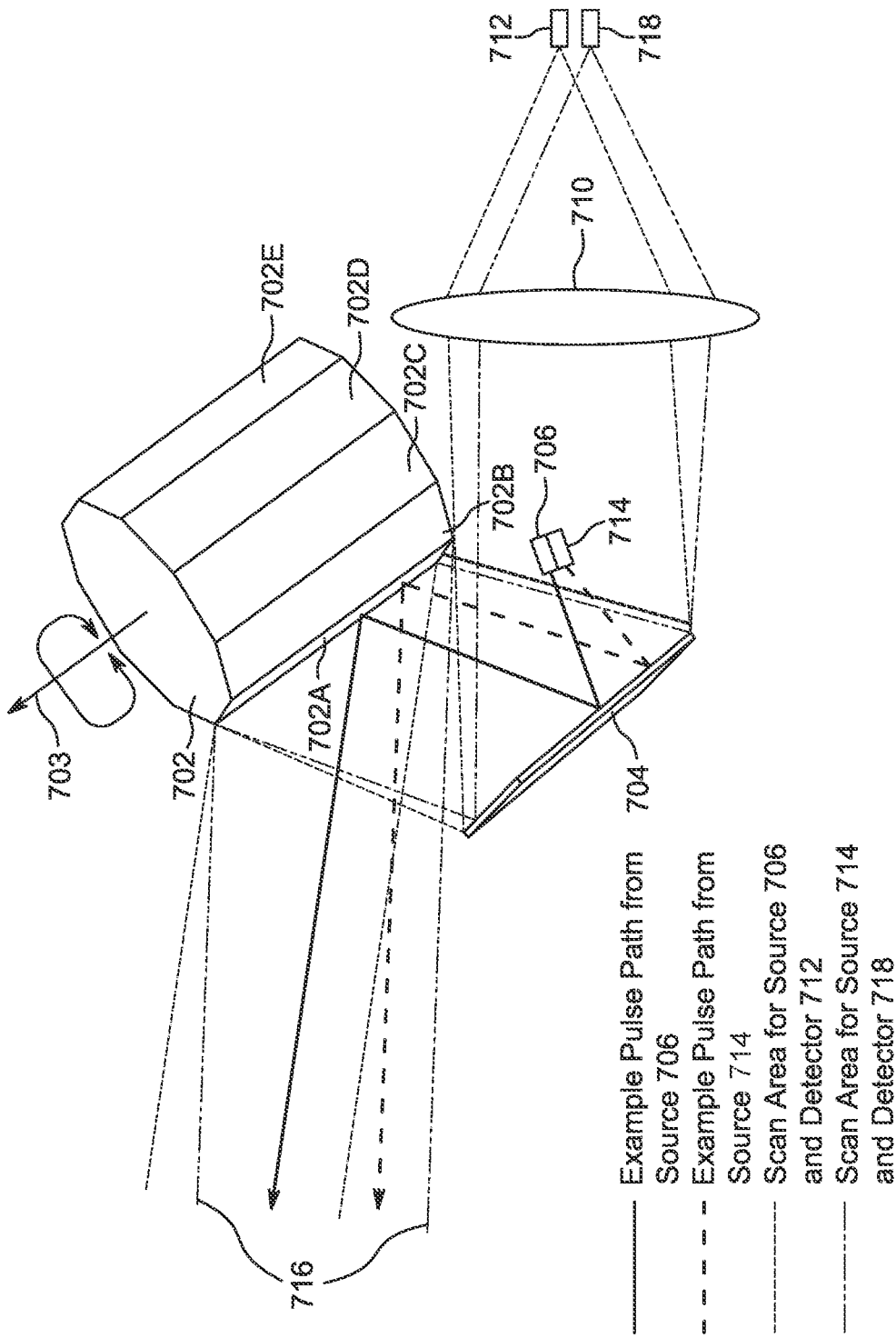
FIG. 8 depicts an embodiment of a signal steering system using two light sources and two detectors.

FIG. 8 depicts a similar system as depicted in FIG. 7 except a second light source is added that provides one or more signals from output 714. The light source for output 714 may be the same or different than the light source for output 706, and the light transmitted by output 714 may have the same or a different wavelength as the light transmitted by output 706. Using multiple light outputs can increase the points density of a points map without sacrificing the maximum unambiguous detection range of the system. For example, light output 714 can be positioned to transmit light at a different angle from output 706. Because of the different angles, light transmitted from light source 706 is directed to an area different from light transmitted from output 714. The dotted line shows one example pulse path for pulses emitted from output 714. Consequently, one or more objects located at two different areas within a region can scatter and return light to the LiDAR system. For example, the region 716 (the dashed/double-dotted line) indicates the region from which return signals from scattered signals returns to the LiDAR system. The returned light is reflected off polygon 702 and mirror galvanometer 704 and focused on detectors 712 and 718 by lens 710. Detectors 712 and 718 can each be configured to receive returned light from one of the outputs 706 and 714, and such configuration can be achieved by precisely controlling the position of the detectors 712 and 718 as well as the wavelength(s) of the transmitted light. Note that the same lens (or optic system) can be used for both detector 712 and 718. The offset between outputs 706 and 714 means that the light returned to the LiDAR system will have a similar offset. By properly positioning detectors 712 and 718 based on the relative positioning of their respective light source outputs (e.g., respective positions of outputs 706 and 714) and, optionally, by properly controlling the wavelength(s) of the transmitted light, the returned light will be properly focused on to the correct detectors, and each received light can be a point in the points map. Therefore, compare to the system with only one output 706, the system with two outputs can maintain the same pulse repetition rate and produce twice the number of points or reduce the pulse repetition rate by half and still produce the same number of points. As a non-limiting example, a system with two light outputs can reduce the pulse repetition rate from 1 MHz to 500 KHz, thereby increasing its maximum unambiguous detection range from 150 meters to 300 meters, without sacrificing points density of the resulting points map. A pulse repetition rate of between 200 and 2 MHz is contemplated and disclosed.

Figure 9:
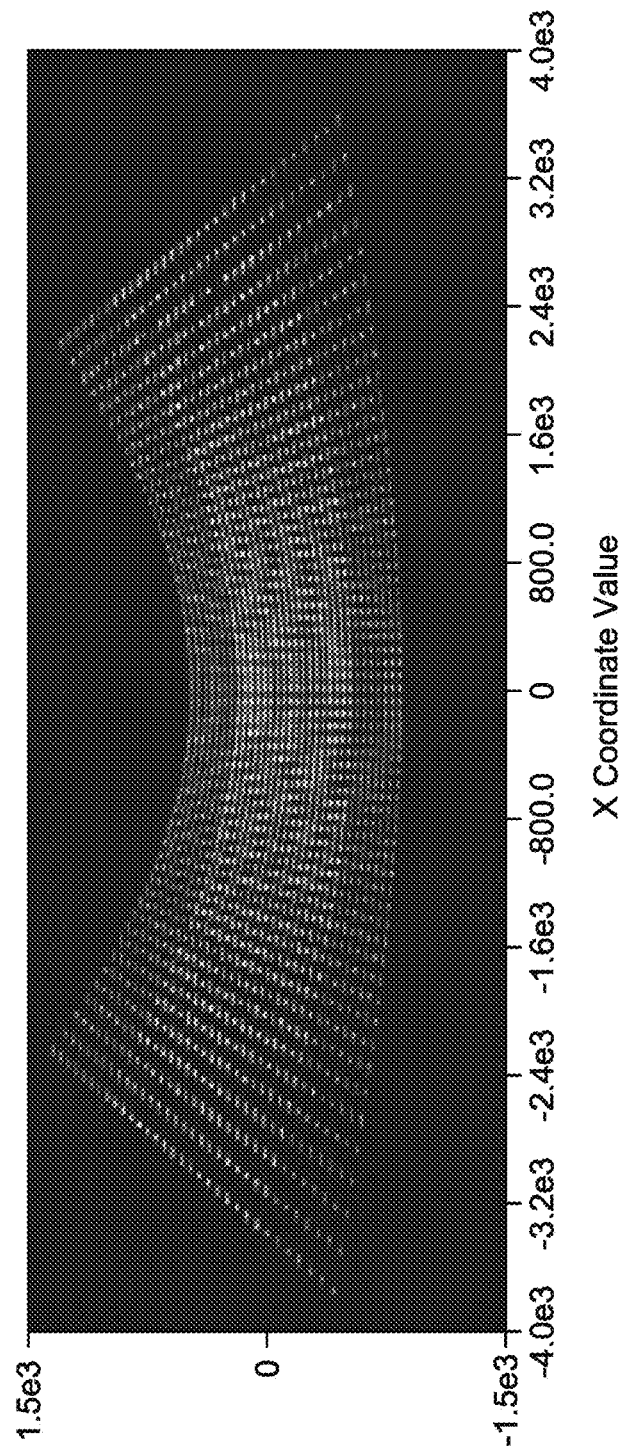
FIG. 9 depicts a portion of the scan pattern generated by the embodiment from FIG. 8.

FIG. 9 depicts a point map from a first design. This design has two channels (e.g., two light source outputs and two light detectors) placed in a way that the exiting beams have an angle of 8 degrees vertically. The scanned pattern has vertical overlap. The scanned range is +−56 degrees horizontally and +12~−20 degrees vertically.

Figure 10:
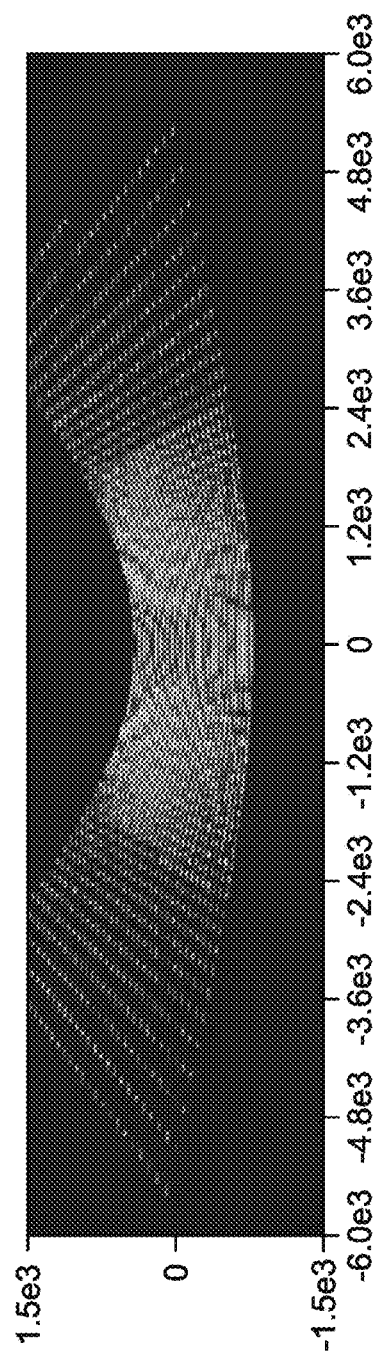
FIG. 10 depicts a portion of the scan pattern according to another embodiment.

FIG. 10 depicts a point map from a second design. This design has two channels (e.g., two light source outputs and two light detectors) placed in a way that the exiting beams have an angle of 6 degrees. The scanned pattern has horizontal overlap (+−45 degrees). The scanned range is +−67 degrees horizontally and +12~−20 degrees vertically.

Exiting beams of two channels are not necessary to separate with a certain angle (e.g. 6 degree in FIG. 10) to obtain a larger horizontal range. Horizontal displacement of existing beams can be used to expand the horizontal range. For example, two exit beams may be pointed that same angle, but are offset with respect to each other in the same plane. Due to these different positions, each channel is reflected by different part of polygon and therefore covers a different horizontal range. By combining the two channels, the total horizontal range is increased.

Figure 11:
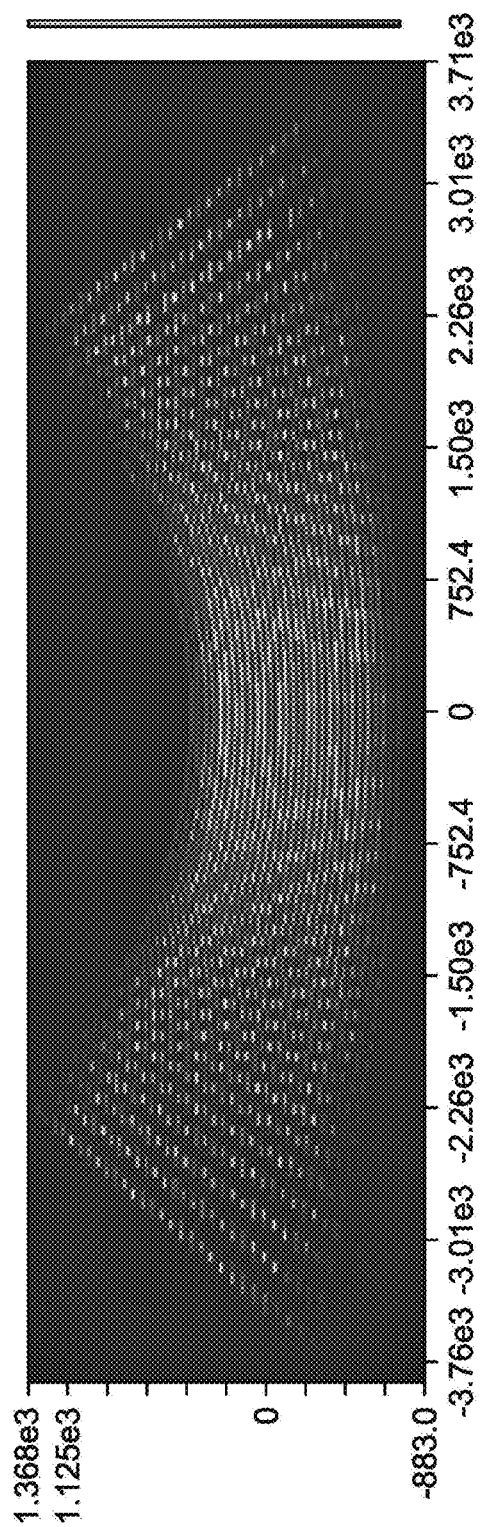
FIG. 11 depicts a portion of the scan pattern according to yet another embodiment.

FIG. 11 depicts a point map from a third design. This design has three channels (e.g., three light source outputs and three light detectors) to increase point density. About 2.88 million points per second can be obtained by using 3 fiber tips and 3 detectors. The resolution can be further reduced to 0.07 degrees for both directions. The speed of the polygon can be reduced to 6000 rpm.

Figure 12:
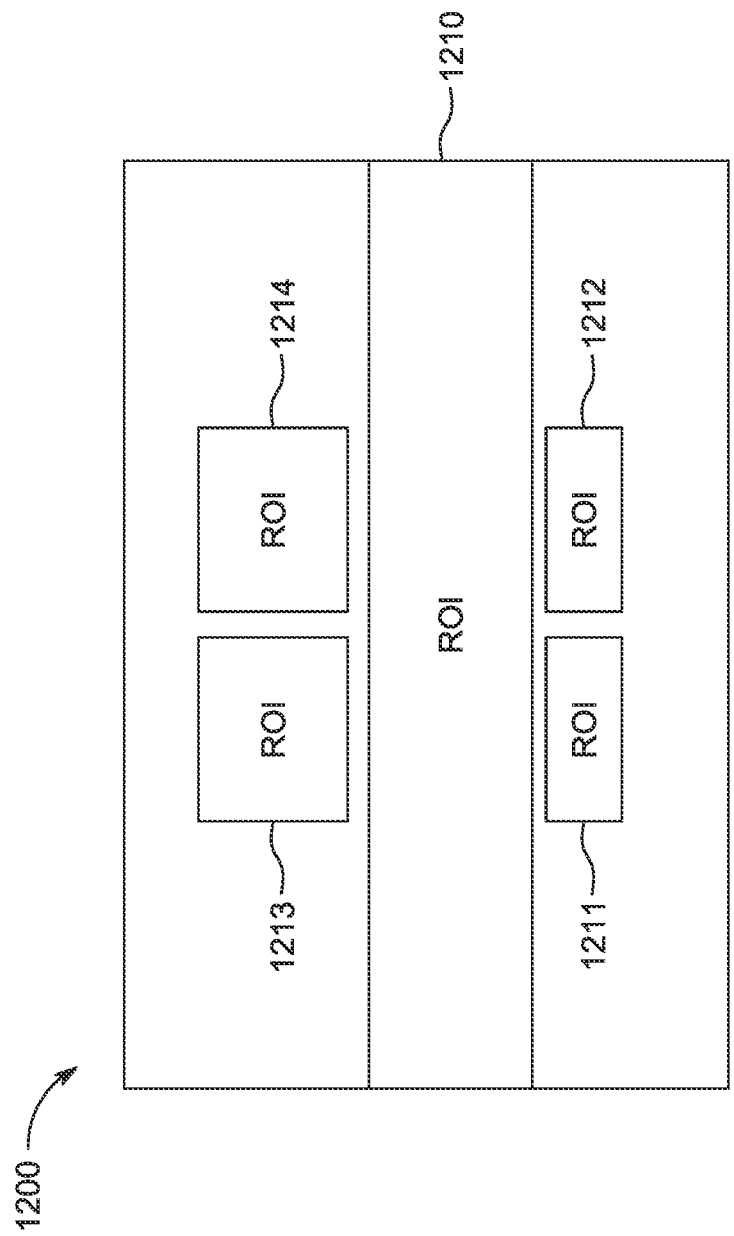
FIG. 12 shows illustrative field of view of a LiDAR system according to an embodiment.

FIG. 12 shows illustrative field of view (FOV) 1200 of a LiDAR system according to an embodiment. As shown, FOV 1200 is a two-dimensional space bounded by X and Y dimensions. Although the LiDAR system can collect data points from the entirety of FOV 1200, certain regions of interest (ROI) may have higher precedence over other regions within FOV 1200 (e.g., such as undesired regions that occupy all space within FOV 1200 that is not a ROI). FIG. 12 shows five different illustrative ROIs 1210-1214 to illustrate different regions within FOV 1200 that require additional data points than other regions within FOV 1200. For example, ROI 1210 occupies an entire band of a fixed y-axis height across the x-axis of FOV 1200. ROIs 1211 and 1212 show localized ROIs below ROI 1210, and ROIs 1213 and 1214 show localized ROIs above ROI 1210. It should be understood that any number of ROIs may exist and that the ROIs can occupy any portion of FOV 1200. Embodiments discussed herein enable additional data points to be collected in the ROIs in a manner that does not disrupt the operation of the LiDAR system. That is, a LiDAR scanning system may scan the entirety of FOV 1200 each scan cycle, while controlling one or more parameters to obtain additional data points from (or increase resolution) of the ROIs 1211-1214.

Figure 13:
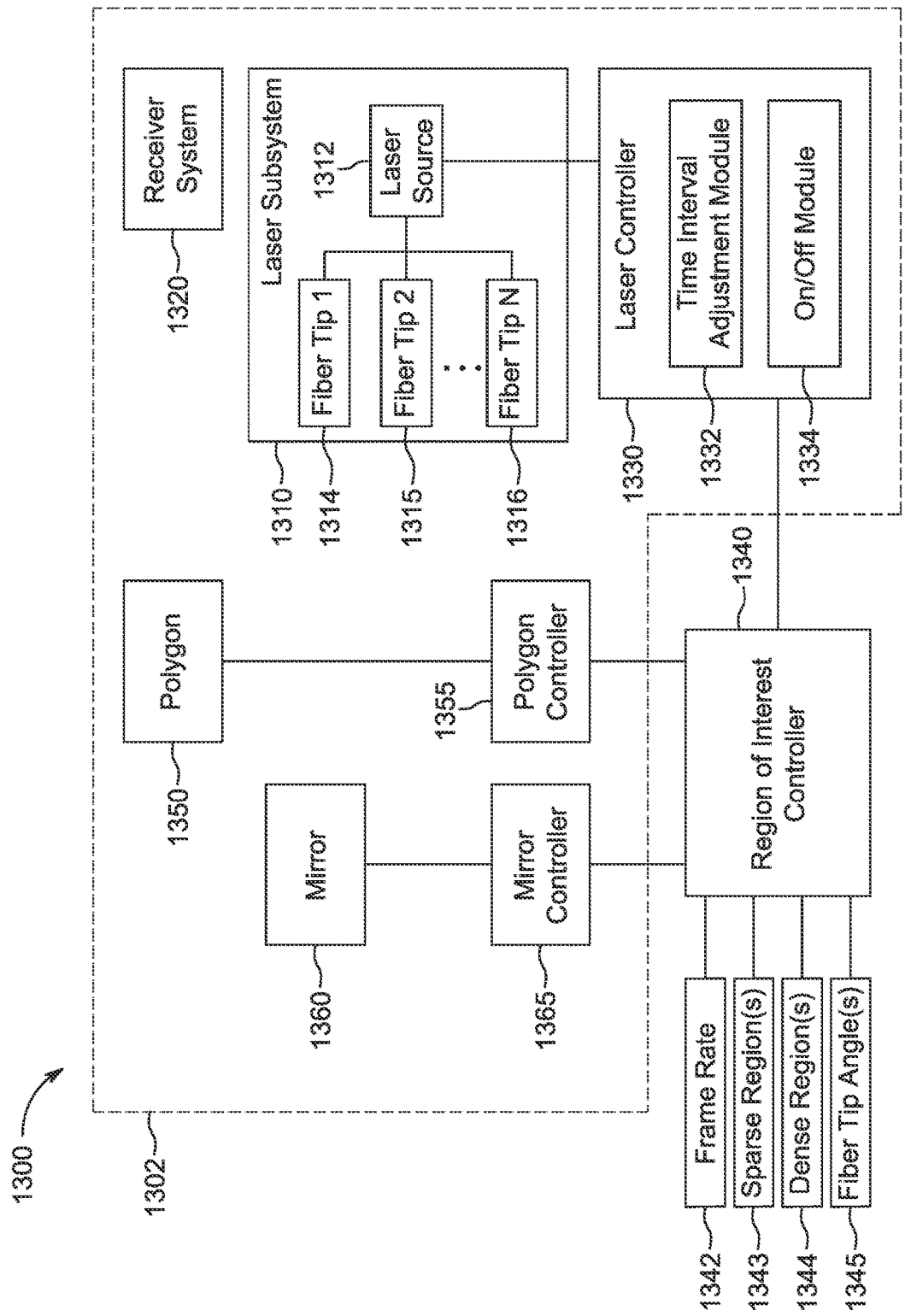
FIG. 13 shows an illustrative block diagram of LiDAR system according to an embodiment.

FIG. 13 shows an illustrative block diagram of LiDAR system 1300 according to an embodiment. LiDAR system 1300 can include laser subsystem 1310, receiver system 1320, laser controller 1330, region of interest controller 1340, polygon structure 1350, polygon controller 1355, mirror 1360, and mirror controller 1365. LiDAR system 1300 may be contained within one or more housings. In multiple housing embodiments, at least one of the housings may be a temperature controlled environment in which selection portions of LiDAR system 1300 (e.g., laser controller 1330, laser source 1312, controller 1340) are contained therein.

Laser subsystem 1310 may be operative to direct light energy towards mirror 1360, which redirects the light energy to polygon structure 1350. Mirror 1360 also operative to redirect light energy received from polygon structure 1350 to receiver system 1320. Mirror 1360 may be moved under the control of mirror controller 1365, which can control the speed and direction of mirror movement. As mirror 1360 moves, it causes light being transmitted by laser subsystem 1310 to interface with different portions of polygon structure 1350. Polygon structure 1350 is moving under the control of polygon controller 1355 and is operative to direct the light energy received from mirror 1360 in accordance with the field of view parameters of LiDAR system 1300. That is, if LiDAR system 1300 has a field of view with range of z, a lateral angle of x, and vertical angle of y, the range z can be controlled by the power of laser source 1312, the vertical angle y can be controlled by the movement of mirror 1360, and the lateral angle x can be controlled by polygon structure 1350. It should be appreciated that in the alternative, the vertical angle can controlled by the polygon structure 1350 and that the lateral angle can be controlled by mirror 1360. Light energy that is reflected back from objects in the field of view and returns to polygon structure 1350 where it is directed back to mirror 1360, which redirects it back to receiver system 1320.

As defined herein, a frame rate may refer to the time it takes for scanning system 1302 to complete one full scan of the FOV. For each frame, scanning system 1302 can obtain data points from each row (or column) of a plurality of rows (or columns) that are defined by the FOV. Each row may correspond to a vertical angle within the vertical range of the FOV. The vertical angle can be controlled by mirror 1360. As mirror 1360 moves, the vertical angle changes, thereby enabling scanning system 1302 to obtain data points from multiple rows within the FOV. Vertical angle resolution refers spacing between adjacent rows of data points. An increase in vertical angular resolution corresponds to denser spacing between adjacent rows, and such an increase can be achieved by decreasing the delta of the vertical angles between adjacent vertical angles. The delta between adjacent vertical angels can be decreased by slowing down the movement of mirror 1360. That is, as mirror movement speed slows down, the change in the vertical angle delta decreases. A decrease in vertical angular resolution corresponds to sparser spacing between adjacent rows, and such a decrease can be achieved by increasing the vertical angle delta. The delta between adjacent vertical angels can be increased by speeding up the movement of mirror 1360. That is, as mirror movement speeds up, the change in the vertical angle delta increases.

The plurality of data points obtained within any row may depend on a horizontal angle within the horizontal range of the FOV. The horizontal range may be controlled by polygon 1350, and the horizontal angle resolution may be controlled by a time interval of successive laser pulses. The time interval is sometimes related to the repetition rate. A smaller time interval can result in increased horizontal angular resolution, and a larger time interval can result in decreased horizontal angular resolution.

The above reference to vertical and horizontal angles and vertical and horizontal angular resolution was made in reference to a system in which mirror 1360 controls the vertical angle. It should be understood that mirror 1360 can be repurposed to control the horizontal angle and used in a system different than that shown in FIG. 13.

Laser subsystem 1310 can include laser source 1312 and fiber tips 1314-1316. Any number of fiber tips may be used as indicated the "n" designation of fiber tip 1316. As shown, each of fiber tips 1314-1316 may be associated with laser source 1312. Laser source 1312 may be a fiber laser or diode laser. Fiber tips 1314-1316 may be aligned in a fixed orientation so that the light exiting each tip strikes mirror 1360 at a particular location. The actual orientation may depend on several factors, including, for example, frame rate, mirror movement and speed, polygon speed, ROIs, repetition rate, etc. Additional discussion of fiber tips and their characteristics in obtaining additional data points within ROIs is discussed in more detail below.

Receiver system 1320 can include various components such as optics, detectors, control circuitry, and other circuitry. The optics may contain light-transmitting optics that gather laser light returned from mirror 1360. Detectors may generate current or voltage signals when exposed to light energy through the optics. The detectors may be, for example, avalanche photo diodes. The outputs of the detectors can be processed by the control circuitry and delivered to a control system (not shown) to enable processing of return pulses.

Laser controller 1330 may be operative to control laser source 1312. In particular, laser controller 1330 can control power of laser source 1312, can control a repetition rate or time interval of light pulses emitted by laser source 1312 (via time interval adjustment module 1332), and can control pulse duration of laser source 1312. Time interval adjustment module 1332 may be operative to control and/or adjust the repetition rate/time interval of the transmitter pulse of laser 1310. Time interval adjustment circuitry 1332 can vary the repetition rate/time interval for different regions within the FOV. For example, the repetition rate may be increased for ROIs but may be decreased for areas of FOV that are not of interest. As another example, the time interval can be decreased for ROIs and increased for areas of FOV that are not of interest.

Region of Interest controller 1340 may be operative to control LiDAR system 1300 to obtain additional data points for the ROIs. That is, when LiDAR system 1300 is scanning a ROI, ROI controller 1340 may cause system 1300 to operate differently than when system 1300 is not scanning a ROI. ROI controller 1340 may control operation of laser controller 1330, polygon controller 1355, and mirror controller 1365 to alter the quantity of data being obtained by system 1300. ROI controller 1340 may receive several inputs that dictate how it should control the scanning subsystem 1302. The inputs can include, for example, frame rate 1342, sparse regions 1343, dense regions 1344, distance range, or any other suitable input. Frame rate 1342 may specify the frequency at which scanning subsystem 1302 completes a FOV scan. Sparse and dense regions 1343 and 1344 may provide specific locations of ROIs. For example, dense regions 1344 may correspond to ROIs and sparse regions 1343 may correspond to regions within the FOV that are not ROIs. Fiber tip angles 1345 may be used as a design constraint within which scanning sub-system 1302 operates in order to optimally perform scanning.

Polygon structure 1350 may be constructed from a metal such as aluminum, plastic, or other material that can have a polished or mirrored surface. Polygon structure 1350 may be selectively masked to control the lateral dispersion of light energy being projected in accordance with the field of view of scanning subsystem 1302. Polygon structure 1350 can include a number of facets to accommodate a desired horizontal field of view (FOV). The facets can be parallel or non-parallel to its symmetric axis. Polygon structure 1350 is operative to spin about an axis in a first direction at a substantially constant speed. The shape of polygon structure 1350 can be trimmed (e.g., chop off the sharp corner or tip to reduce overall weight or required geometry envelope, chamfer the sharp edge to reduce air resistance) for better operational performance.

Mirror 1360 may be a single plane or multi-plane mirror that oscillates back and forth to redirect light energy emitted by laser source 1312 to polygon 1350. The single plane mirror may provide higher resolutions at the top and bottom portions of the vertical field of view than the middle portion, whereas the multi-plane mirror may provide higher resolution at a middle portion of the vertical field of view than the top and bottom portions. Mirror 1360 may be a galvanometer. Varying the oscillation speed within an oscillation cycle can enable scanning subsystem 1302 to acquire sparse or dense data points within the FOV. For example, if dense data points are required (for a particular ROI), the movement speed may be reduced, and if sparse data points are required (for non-ROIs), the movement speed may be increased.

Figure 14:
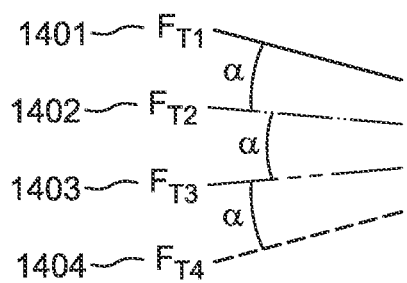
FIG. 14 shows an illustrative fiber tip arrangement according to an embodiment.

FIG. 14 shows illustrative fiber tip arrangement according to an embodiment. Four fiber tips 1401-1404 are shown to be oriented with respect to each other such that the same angle α exist between adjacent fiber tips. Multiple fiber tips (as opposed to just one fiber tip) may be used so that high data collection is achieved. When an ROI is being scanned, the mirror movement speed is adjusted to a ROI speed (e.g., a speed that is slower than a sparse or non-ROI speed), the combination of additional fiber tips and reduced relative mirror movement speed yields denser data capture. Moreover, when a non-ROI is being scanned, the mirror movement speed operates at a non-ROI speed (e.g., a speed that is faster than the ROI speed), the presence of multiple fiber tips ensures that sufficient data collection is achieved. The angle α may be selected based on properties of the light energy being emitted by each fiber tip (e.g., size), speed and movement characteristics of a mirror (e.g., mirror 1360) for both ROIs and non-ROIs, and speed of the polygon (e.g., polygon structure 1350). The angles between each of tips may be the same or they can be different.

In some embodiments, all four fiber tips may be associated with the same laser source. Thus, if the laser source is turned OFF, none of the fiber tips will emit light energy. In another embodiment, each fiber tip may be associated with its own respective laser source. This embodiment provides a high degree of ON/OFF control of each fiber tip. In yet another embodiment, a subset of the fiber tips may be associated with the same laser source. For example, fiber tips FT1 and FT3 may share a first common laser source, and fiber tips FT2 and FT4 may share a second common laser source. This embodiment provides a balance between all or none and individual ON/OFF control.

Figure 15A:
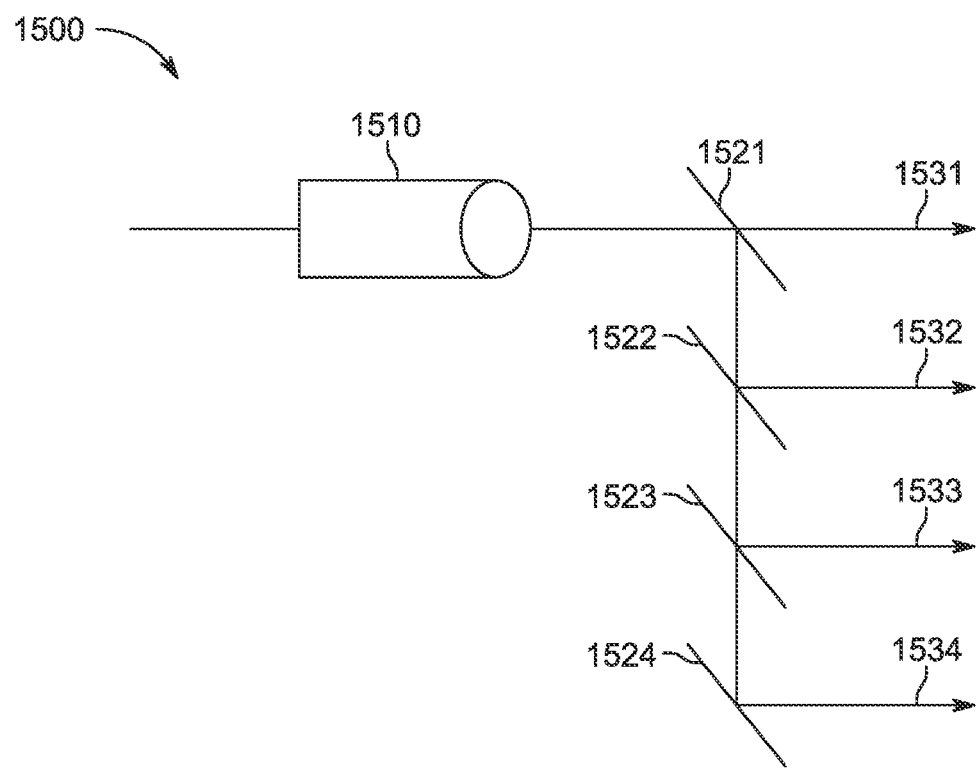
FIGS. 15A and 15B show multiple mirror alignment arrangement that may be used for ROI and non-ROI embodiments.

FIG. 15A shows a multiple mirror alignment arrangement (MMAA) 1500 that may be used for ROI and non-ROI embodiments. MMAA 1500 is an alternative to using multiple fiber tips such as that shown in FIG. 14. As shown, MMAA 1500 shows collimator 1510, partial reflective mirrors 1521-1523, and reflective mirror 1524. Light energy originating from a laser source (not shown) is routed to collimator 1510, which directs light energy to partial reflective mirror 1521. Partial reflective mirror 1521 permits a portion of the light energy to pass through (shown as exit path 1531) and the remaining light energy is redirected to partial reflective mirror 1522. Partial reflective mirror 1522 allows a portion of the light energy to pass through to partial reflective mirror 1523. Partial reflective mirror 1522 redirects light energy along exit path 1532. Partial reflective mirror allows a portion of the light energy to pass through to partial reflective mirror 1524. Partial reflective mirror 1523 redirects light energy along exit path 1533. Reflective mirror 1524 may redirect all or at least a portion of all the remaining light energy along exit path 1534.

The angles between adjacent exit paths may be selected to achieve the desired resolution for ROIs and non-ROIs. For example, angles between adjacent exit paths may be similar to the α angles shown in FIG. 14. In some embodiments, the angle between adjacent exit paths may be fixed. In other embodiments, the angle between adjacent exit paths may be variable. Variable angle adjustment may be used to provide different resolutions on demand. For example, if the LiDAR system is being used in a vehicle, the angles may be set to a first configuration when the vehicle operating in a first mode (e.g., driving at highway speeds or vehicle is driven by a first driver) and may be set to a second configuration when the vehicle is operating in a second mode (e.g., driving at city speeds or vehicle is driven by a second driver).

Figure 15B:
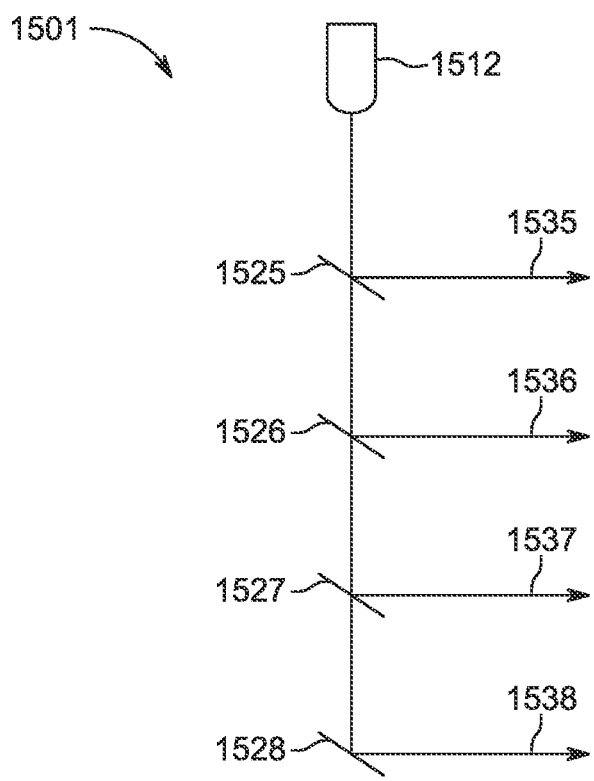

FIG. 15B shows another multiple mirror alignment arrangement (MMAA) 1501 that may be used for ROI and non-ROI embodiments. MMAA 1501 is an alternative to MMAA 1500. As shown, MMAA 1501 shows collimator 1512, partial reflective mirrors 1525-1527, reflective mirror 1528, and exit paths 1535-1538. MMAA 1501 is similar to MMAA 1500 with exception of the positioning of collimator 1512. As shown, collimator 1512 is positioned above mirror 1525. If desired, collimator 1512 can be positioned below mirror 1528. As a further alternative, collimator 1512 can be aimed at a different mirror such as mirror 1526 or mirror 1527, and such mirrors can redirect the light energy as necessary to achieve the desired results.

Figure 15C:
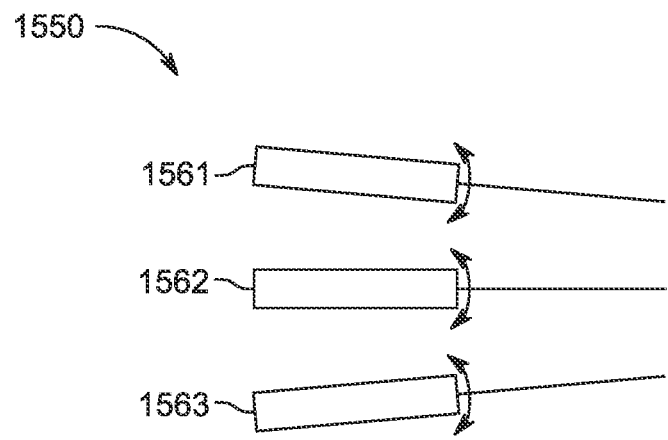
FIG. 15C shows an illustrative multiple collimator arrangement that may be used for ROI and non-ROI embodiments.

FIG. 15C shows an illustrative multiple collimator arrangement 1550 that may be used for ROI and non-ROI embodiments. Arrangement 1550 can include collimators 1561-1563. Each of collimators 1561-1563 may be associated with its own laser source. Associating each collimator with its own laser source enables selective turning ON and OFF of light energy emanating from each collimator. For sparse regions, one or more of the laser sources may be turned OFF (to save power) and for dense regions, all laser sources may be turned ON to maximize resolution. Each of collimators 1561-1563 may be fixed in a particular orientation to achieve the desired a angle between each collimator. If desired, each of collimators 1561-1563 may be movable to dynamically adjust the α angle between each collimator.

Figure 15D:
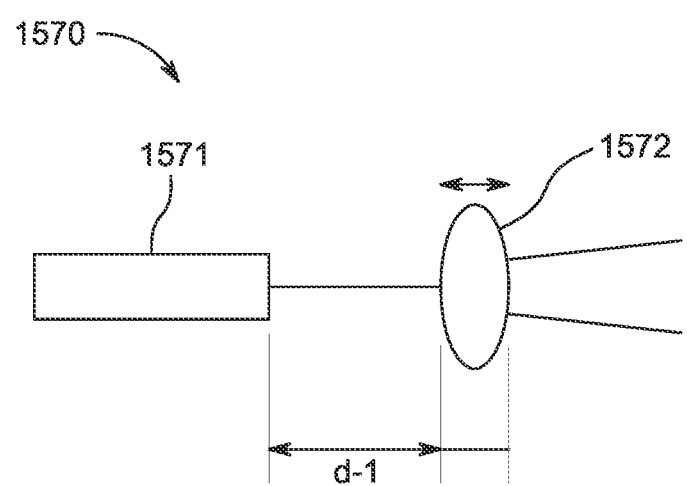
FIG. 15D shows an illustrative collimator and lens arrangement according to an embodiment.

FIG. 15D shows an illustrative collimator and lens arrangement 1570 that may be used to control divergence of the light beam existing collimator 1571 according to an embodiment. Lens 1572 may be moved towards and away from collimator 1571 to adjust divergence of the light beam. Arrangement 1570 may be used to adjust the size of the light beam as it is projected by the scanning system. For ROI beam, it may be desirable to have a relatively narrow beam. To produce a relatively narrow beam, lens 1572 may positioned at a narrow beam distance away from the collimator 1571. For non-ROI regions, it may be desirable to have a relatively wide beam. To produce a relatively wide beam, lens 1572 may positioned at a wide beam distance away from the collimator 1571.

Figure 16:
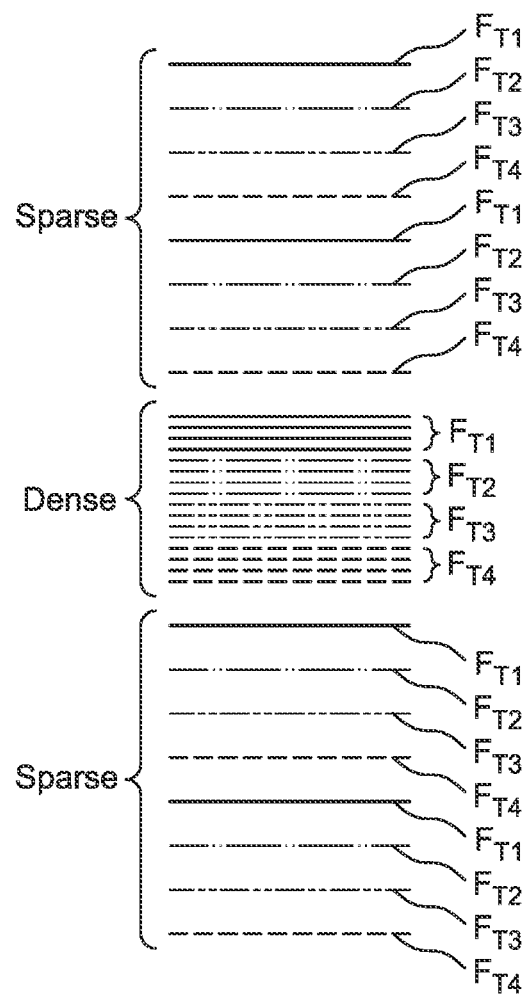
FIG. 16 shows illustrative scanning resolution using multiple fiber tips, a multiple mirror alignment arrangement, or multiple collimator arrangement according to an embodiment.
Figure 17A:
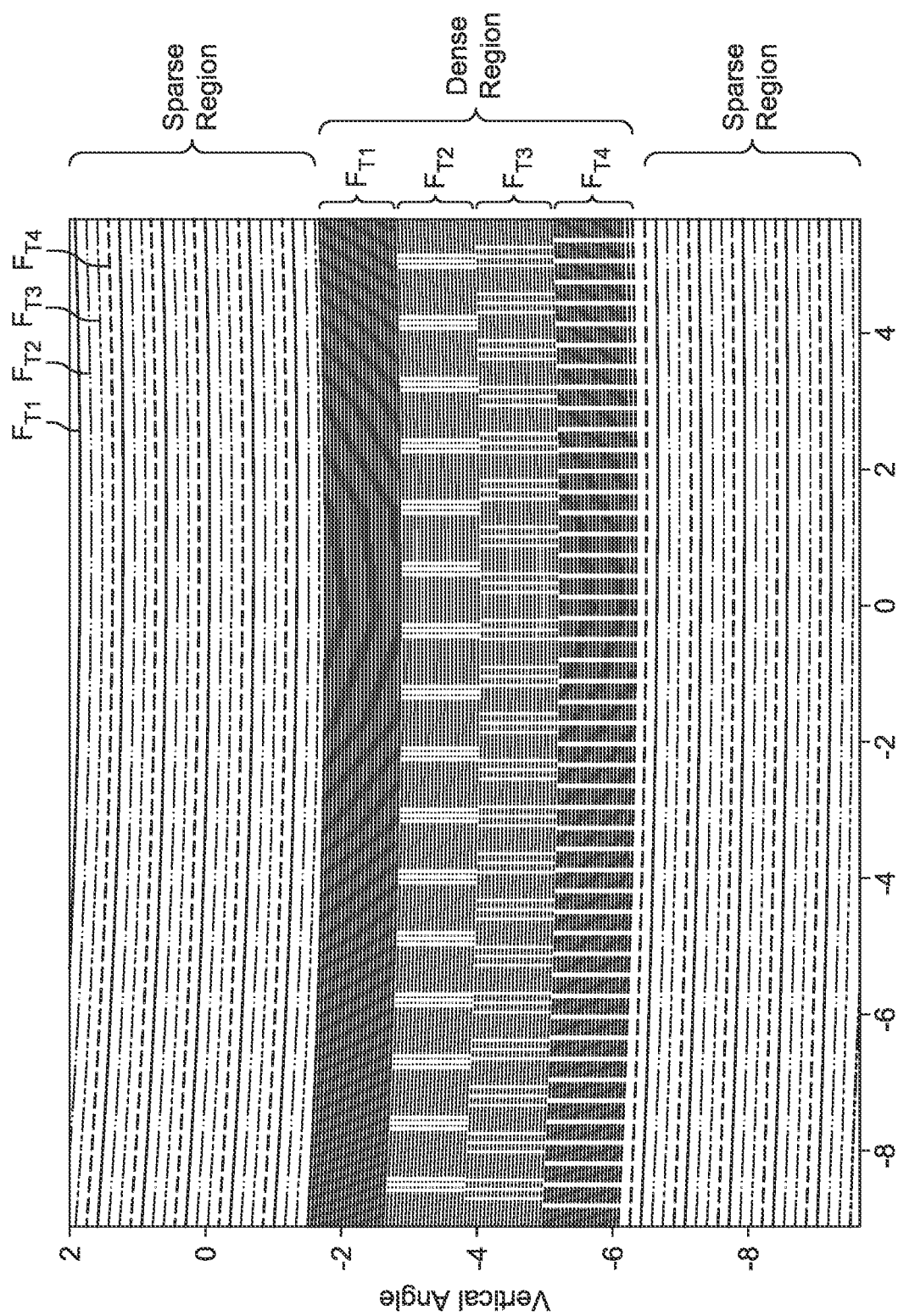
FIG. 17A shows another illustrative diagram of vertical resolution using multiple fiber tips or a multiple mirror alignment arrangement, according to an embodiment.

FIG. 16 shows illustrative scanning resolution using multiple fiber tips, a multiple mirror alignment arrangement, or multiple collimator arrangement according to an embodiment. The illustrative vertical resolution lines from fiber tips (FT1-FT4) are shown. The resolution lines are grouped according to sparse resolution and dense resolution as shown. In sparse regions, the scanning system is moving the mirror at a relatively faster speed than when in the dense region, and in dense regions, the scanning system is moving the mirror at a relatively slower speed than when in the sparse region. The spacing between the adjacent scanning lines (as shown by the repeated pattern of $FT_1$-$FT_4$) is substantially equidistant. This equidistant spacing may be made possible by coordinating the alignment of the fiber tips with the frame rate, mirror speed, polygon speed, and any other suitable factors. In contrast, if alignment of fiber tips is not properly coordinated, the equidistant spacing may not be possible, thereby yielding an undesirable scanning pattern. In the dense region, each fiber tip may provide multiple lines of resolution. For example, as shown, FT1 provides four lines of resolution before FT2 provides its four lines of resolution. Thus, each fiber tip provides four lines of resolution before transitioning to the next fiber tip. It should be understood that the number of lines of resolution provided by each fiber tip depends on a number of factors, including, for example, mirror speed, polygon speed, and angle between fiber tips. The lines of resolution among fiber tips may interlace at the transition between the sparse and dense regions. For example, at least one line of resolution from one or more of fiber tips FT2-FT4 may be interlaced among the four lines of resolution pertaining to FT1 (as shown in FIG. 17A).

The angle between the fiber tips (e.g., the α) may be selected based on the mirror speeds, polygon speed, desired angular resolution of the ROI, and a requirement for the spacing between the resolution lines in the sparse region(s) to be substantially equidistant to each other. At least two different mirror speeds are used to provide the dense and sparse resolutions, and it is the variance in mirror speeds that can cause the resolution lines to be non-equidistant if the angles between fiber tips are not properly aligned. For example, assume that the angle of the dense region is θ. θ can represent the total degrees within the FOV that are part of the ROI and require dense resolution. If the mirror speed is constant throughout the entire frame, the angle between fiber tips, α, can be approximately θ/n, where n is the number of fiber tips. This $α_{cs}$, referred to as angle with constant speed may represent a target angle for the fiber tips, but additional calculations are required to take into account that the mirror operates at different speeds, and as a result α, cannot be set to exactly θ/n. The sparse regions must be taken into account. In the sparse region, assume that the desired angle between adjacent lines of resolution is φ. For the example, ϕ may exist between FT1 and FT2, between FT2 and FT3, between FT3 and FT4, between FT4 and FT1 in the sparse region. In order to achieve ϕ between different fiber tips, the angle between fiber tips can be calculated by the following equation:

$$\alpha = \alpha_{vs} = \phi * n * 2 - \phi$$

where $\alpha_{vs}$ is the angle with a variable speed mirror, ϕ is the angle between adjacent lines of resolution within the sparse region, n is the number of fiber tips, and the number 2 is a scaling factor to take into account overlapping lines of resolution. The variables of ϕ, n, mirror speed, and polygon speed are selected such that $\alpha_{vs}$ is the same as or approximately the same as $\alpha_{cs}$. Selecting the variables such that $\alpha_{vs}$ is the same as or approximately the same as $\alpha_{cs}$, enables the scanning system to achieve the desired scanning densities for both ROI and non-ROI regions within the FOV each frame.

FIG. 17A shows another illustrative diagram of vertical resolution using multiple fiber tips or a multiple mirror alignment arrangement, according to an embodiment. Sparse regions and a dense region are shown. Four fiber tips FT1-4 are used. In the sparse region, the resolution lines for each fiber tip are evenly spaced. In the dense region, the vertical lines of resolution are substantially more dense than the vertical lines of resolution in the sparse regions. Within the dense region, the vertical lines of resolution are grouped predominantly for each fiber tip, however, interlacing resolution lines from other fiber tips may exist within a particular group.

Figure 17B:
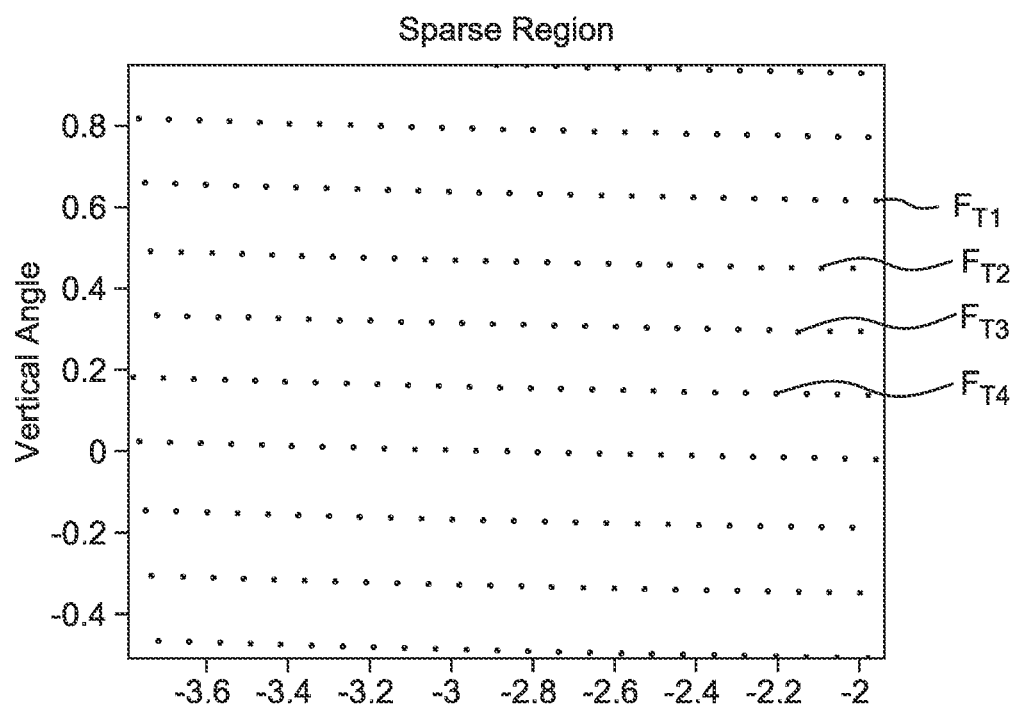
FIG. 17B shows an illustrative close-up view of a sparse region within FIG. 17A
Figure 17C:
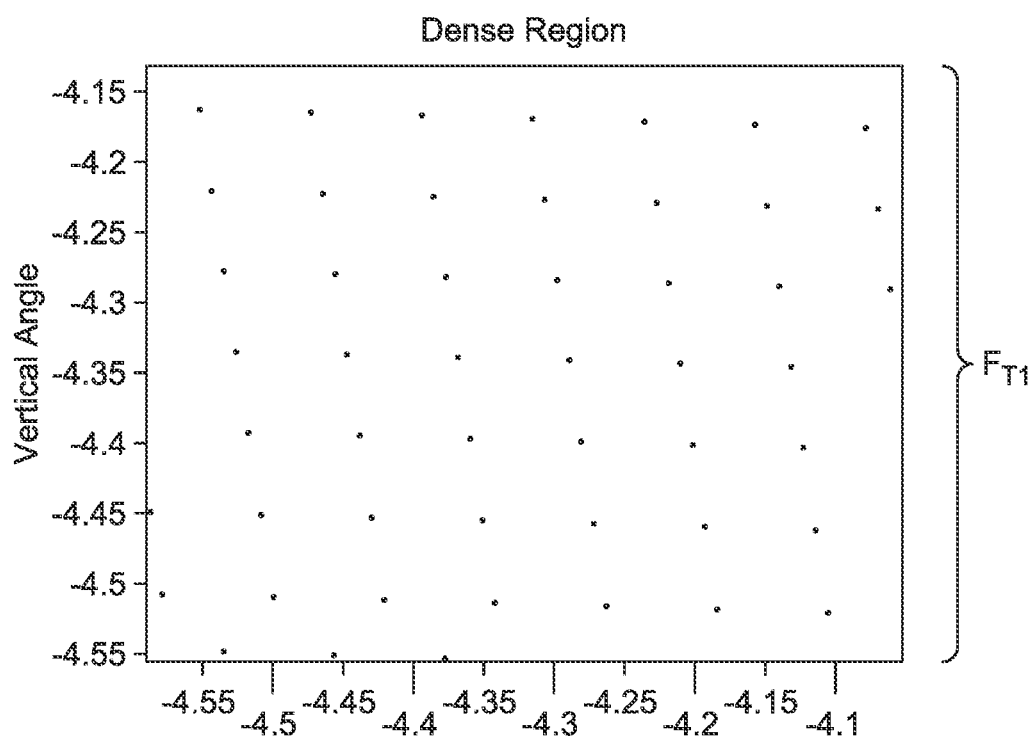
FIG. 17C shows an illustrative close-up view of the dense region within FIG. 17A, according to various embodiments.

FIG. 17B shows an illustrative close-up view of a sparse region within FIG. 17A and FIG. 17C shows an illustrative close-up view of the dense region within FIG. 17A, according to various embodiments. Note that the scaling factor in FIG. 17B is less zoomed in than it is in FIG. 17C. As a result, FIG. 17B shows lines of resolution for multiple fiber tips, and where FIG. 17C shows multiple lines of resolution for only one fiber tip.

The dynamic resolution discussed above has been in the context of dynamic vertical resolution. If desired, the laser subsystem (e.g., the fiber tips, multiple mirror alignment arrangement, or multiple collimator arrangement) can be oriented in a horizontal direction (as opposed to the above-described vertical direction) to provide dynamic horizontal resolution.

Assuming speed changes to mirror movement are used to control the vertical resolution, the repetition rate or time interval can be changed to dynamically control the horizontal resolution. This provides dual axis dynamic resolution control that can be synchronized by a controller (e.g., ROI controller 1340) to provide increased resolution for ROIs and decreased resolution for non-ROIs for both vertical and horizontal orientations. For example, when the scan cycle comes across an ROI, the mirror movement speed is decreased and the time interval between successive light pulses is decreased (thereby increasing repetition rate). When the scan cycle comes across a non-ROI, the mirror movement speed is increased and the time interval between successive light pulses is increased (thereby decreasing repetition rate).

In some embodiments, the laser source(s) can be selectively turned ON and OFF to provide vertical dynamic range (assuming the laser subsystem is oriented as such). This can eliminate the need to adjust the mirror speed to achieve dynamic vertical resolution. If desired, however, the laser source(s) can be selectively turned ON and OFF in conjunction with variations in mirror movement speed.

Figure 18:
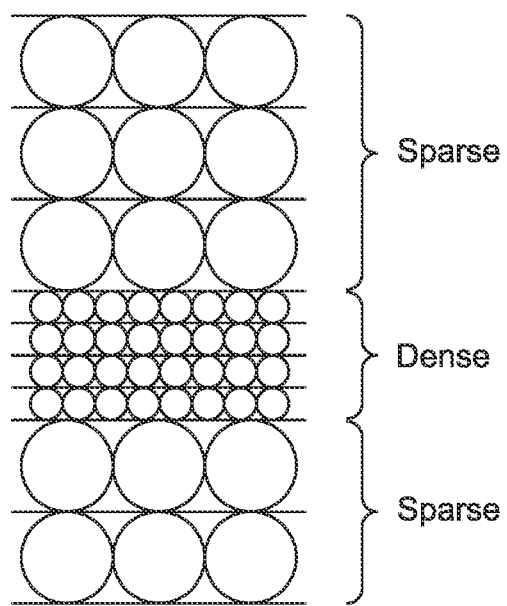
FIG. 18 shows illustrative an FOV with variable sized laser pulses according to an embodiment.

FIG. 18 shows illustrative FOV 1800 with variable sized laser pulses according to an embodiment. FOV 1800 includes two sparse regions and one dense region as shown. Both the sparse and dense regions show illustrative light pulses that take the form of different sized circles. The sparse sized circles are larger than the dense sized circles. When the scanning system is projecting light to sparse region, the mirror speed may be moving at a sparse speed and the repetition rate may be set to a sparse region repetition rate. Conversely, when the scanning system is projecting light to the dense region, the mirror speed may be moving at the dense speed and the repetition rate may be set to a dense region repetition rate. The sparse speed is faster than the dense speed and the sparse region repetition rate is slower than the dense region repetition rate. As a result, there are fewer light pulses being sent into the sparse region than in the dense region. If the circle size of the light pulses projected into the sparse region were the same size as the circles in the dense region, underfilling could exist. Underfill may occur when too much space exists between adjacent light pulse circles. Thus, in order to minimize underfill, it is desirable to project an appropriately sized light pulse for both the sparse and dense regions.

Control over light pulse divergence can be exercised using a curved mirror with an integrated planar portion. Such a curved mirror may be used as mirror 1360. FIG. 19A shows an illustrative mirror mirror 1900 arranged to include curved mirror portion 1902, planar portion 1904, and curved mirror portion 1906. Planar portion 1904 is positioned between curved mirror portions 1902 and 1906. Curved mirror portions 1902 and 1906 generate a convergence of light pulses to create a relatively larger sized circle (for the sparse regions). Planar portion 1904 may not alter the size of the light pulse interacting with it, and used projecting light into the dense region.

Figure 19B:
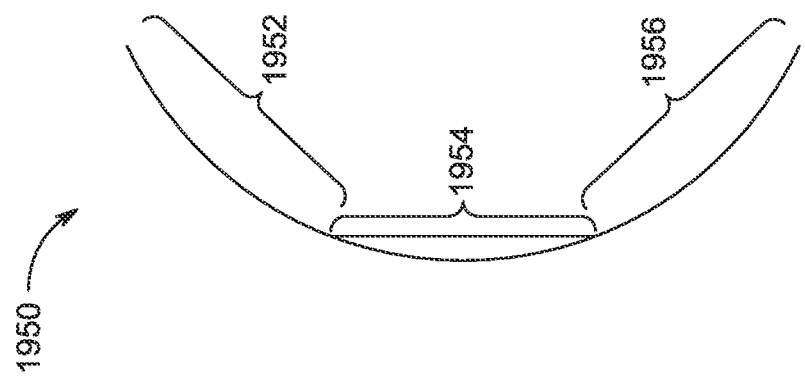
Figure 19A:
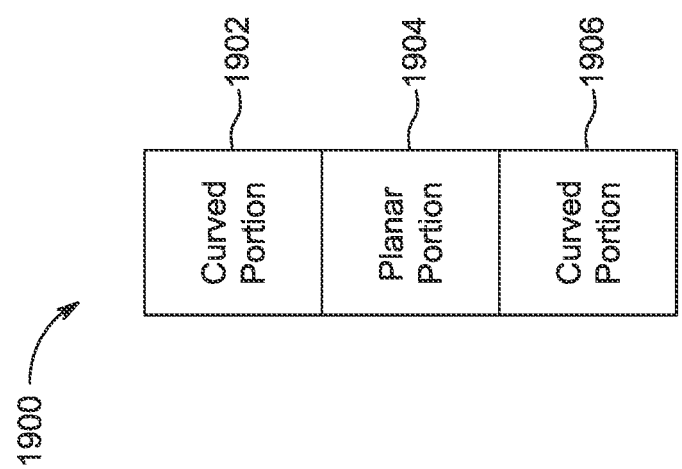

FIG. 19B shows another illustrative mirror 1950 according to an embodiment. Mirror 1950 may include a curved mirror portions 1952 and 1956 and planar portion 1954. In some embodiments, planar portion 1954 may be a prism (e.g., similar to that shown in the mirror of FIG. 21).

FIG. 19C shows another illustrative mirror 1960 that incorporates a concave continuously curved portion 1961 between two planar portions 1962 and 1963 according to an embodiment. The laser beam(s) is/are directed to portion 1961 and any return pulses can be reflected by planar portions 1962 and 1963. FIG. 19D shows yet another illustrative mirror 1970 that incorporates a concave step-wise curved portion 1971 between two planar portions 1972 and 1973 according to an embodiment. The laser beam(s) is/are directed to portion 1971 and any return pulses can be reflected by planar portions 1972 and 1973. FIG. 19E shows yet another illustrative mirror 1980 that incorporates a convex continuously curved portion 1981 between two planar portions 1982 and 1983 according to an embodiment. The laser beam(s) is/are directed to portion 1981 and any return pulses can be reflected by planar portions 1982 and 1983. FIG. 19F shows another illustrative mirror 1990 that incorporates a convex step-wise curved portion 1961 between two planar portions 1962 and 1963 according to an embodiment. The laser beam(s) is/are directed to portion 1991 and any return pulses can be reflected by planar portions 1992 and 1993.

FIG. 19G shows another illustrative mirror 1965 that incorporates a concave portion 1966 between two planar portions 1967 and 1968 according to an embodiment. Concave portion 1966 has a flat portion positioned between two curved portions. The curved portions are convex with respect to the incoming laser beam. The laser beam(s) is/are directed to portion 1966 and any return pulses can be reflected by planar portions 1967 and 1968. FIG. 19H shows yet another illustrative mirror 1975 that incorporates a concave curved portion 1976 between two planar portions 1977 and 1978 according to an embodiment. Concave portion 1976 has a flat portion positioned between two curved portions. The curved portions are concave with respect to the incoming laser beam. The laser beam(s) is/are directed to portion 1976 and any return pulses can be reflected by planar portions 1977 and 1978. FIG. 19I shows yet another illustrative mirror 1985 that incorporates a convex portion 1986 between two planar portions 1987 and 1988 according to an embodiment. Convex portion 1986 has a flat portion positioned between two curved portions. The curved portions are convex with respect to the incoming laser beam. The laser beam(s) is/are directed to portion 1986 and any return pulses can be reflected by planar portions 1987 and 1988. FIG. 19J shows another illustrative mirror 1995 that incorporates a convex portion 1996 between two planar portions 1997 and 1998 according to an embodiment. Convex portion 1996 has a flat portion positioned between two curved portions. The curved portions are concave with respect to the incoming laser beam. The laser beam(s) is/are directed to portion 1996 and any return pulses can be reflected by planar portions 1997 and 1998.

Figure 20:
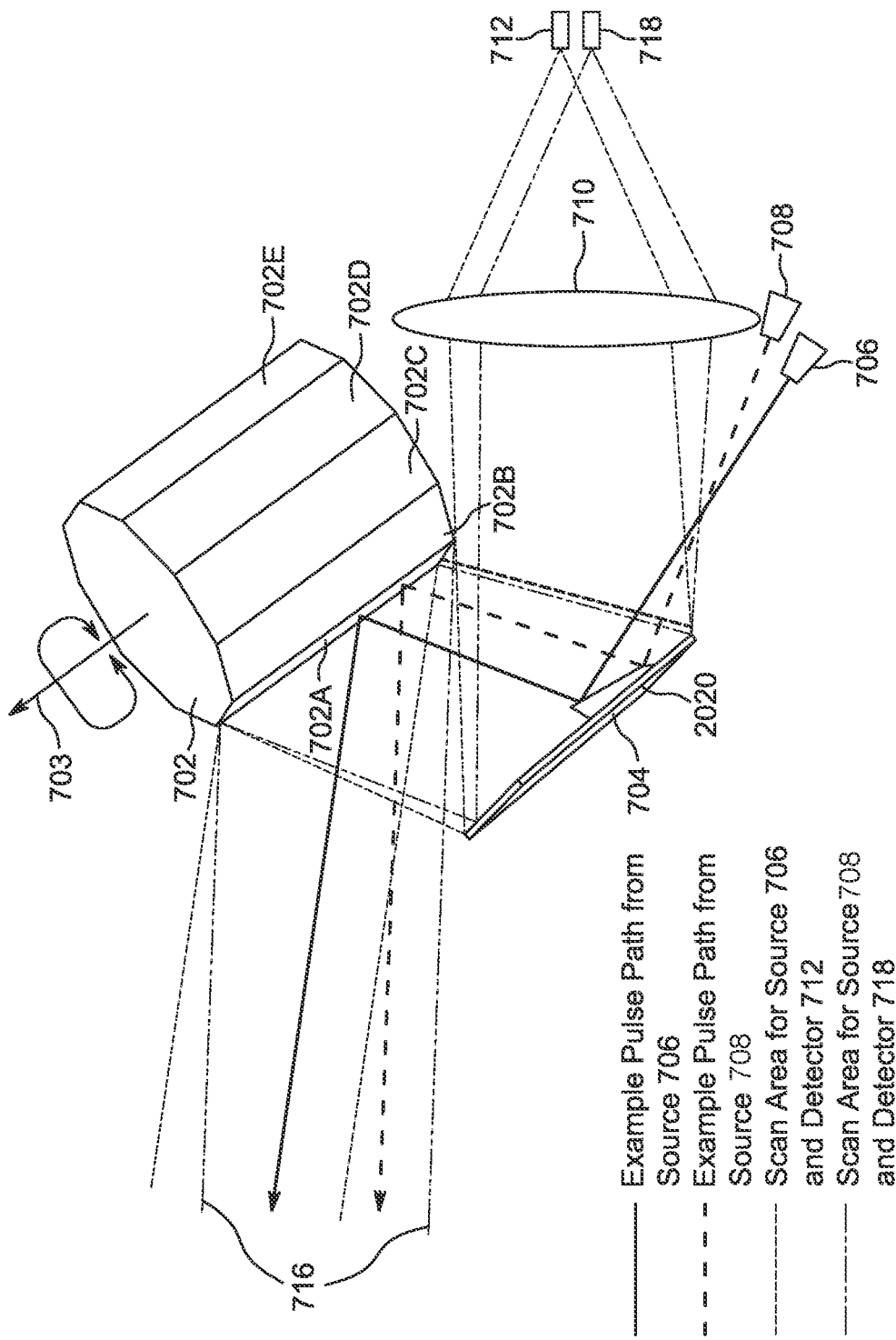
FIG. 20 depicts an alternative system similar to the system as depicted in FIG. 8.

FIG. 20 depicts a similar system as depicted in FIG. 8 except mirror 704 includes prism 2020 and light sources 706 and 708 are moved out of the scan areas for detectors 708 and 712. Placing light sources 706 and 708 out of the return paths for detectors 708 and 712 reduces or eliminates any interference that may occur. It should be understood that the size of prism 2020 is shown in an exaggerated size for illustrative purposes, and that the size of prism is preferably minimized to lessen its impact on the return paths.

Figure 21:
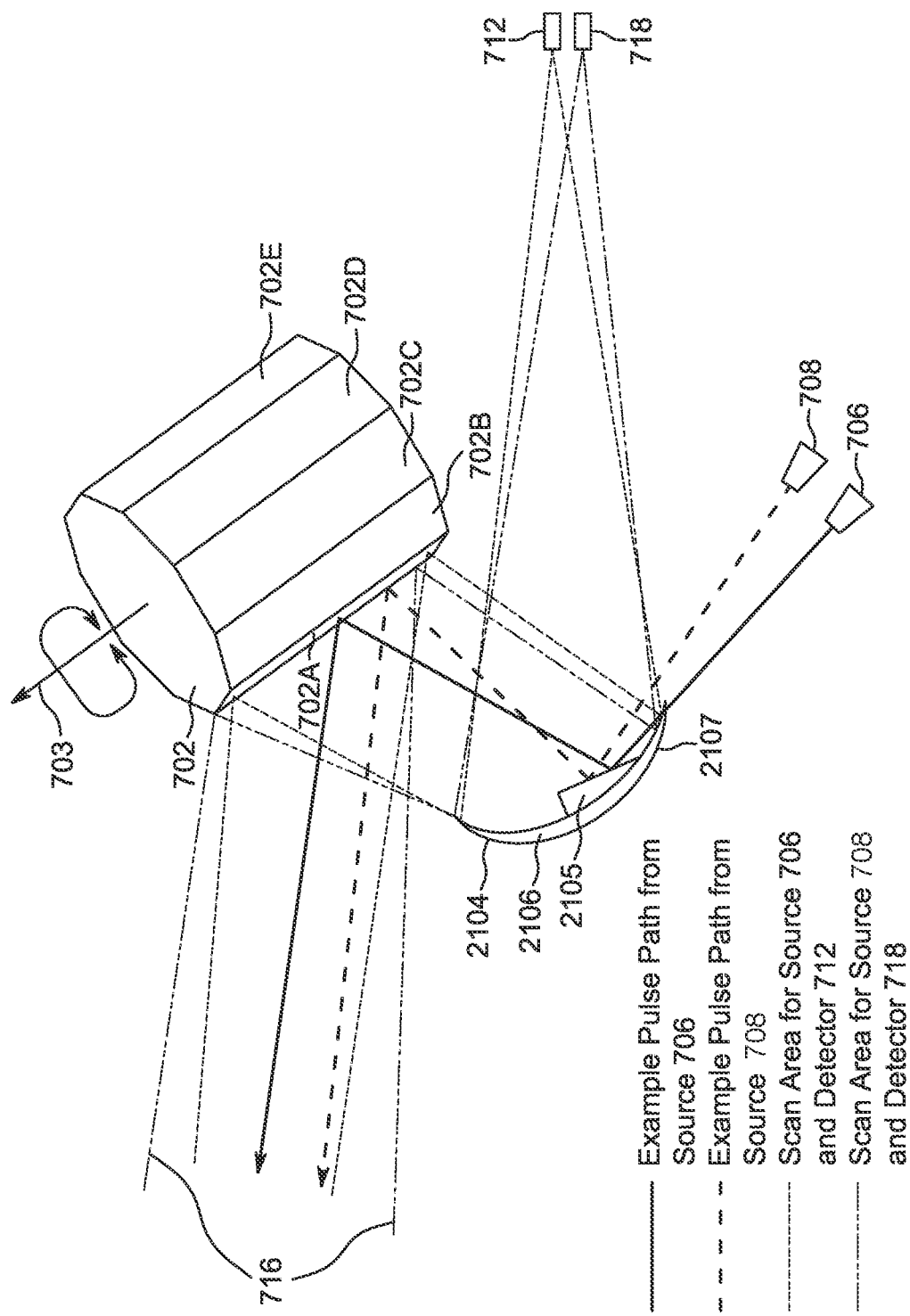
FIG. 21 depicts an alternative system similar to the system as depicted in FIG. 8.

FIG. 21 depicts a similar system as that shown in FIG. 20, except that mirror 704 is replaced with a curved mirror 2104 (e.g., similar to curved mirror 1950). Curved mirror 2104 can include planar portion 2105, which may be a prism, and curved mirror portions 2106 and 2107. Use of curved mirror 2104 can perform double duty of generating different sized laser pulses (as discussed above in connection with FIG. 18) and as a focusing lens 710. As such, lens 710 can be eliminated in the embodiment shown in FIG. 21.

Figure 22:
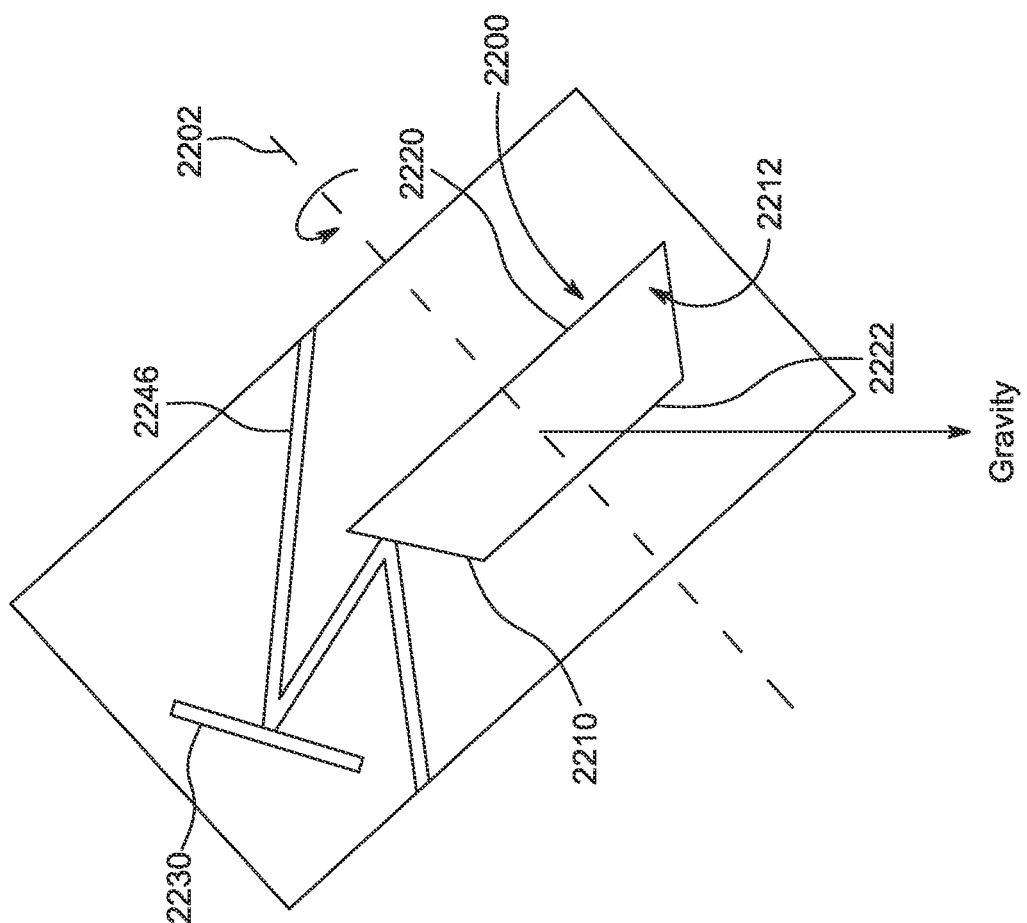
FIG. 22 shows an illustrative polygon according to an embodiment.

FIGS. 9-11 discussed above each show a curve in the data points being acquired in their respective fields of view. The curve can be flattened by using a polygon that has a trapezoidal cross-section such as that shown in FIG. 22. FIG. 22 shows an illustrative polygon 2200 that rotates around rotation axis 2202. Note that the sequence of light travel is different for FIG. 22 than it is for FIG. 13, in that the source light strikes polygon 2200 before interacting with mirror 2230. It should be appreciated that the light source can strike mirror 2230 before interacting with polygon 2200. FIG. 22 also shows illustrative mirror 2230 and exemplary light path 2246. Polygon 2200 may have a trapezoidal cross-section in which facet 2210 is not parallel to facet 2212, but top and bottom surfaces 2220 and 2222 can be parallel to each other. Rotation axis 2202 is not in line with gravity (the gravity axis is shown pointing straight down). That is, if rotation axis 2202 were in line with gravity, it would be parallel with the gravity line. Rotation axis 2202 can be line with gravity, if desired. Rotation axis 2202 may be angled with respect to gravity so that light energy being reflected off of polygon 2200 is pointed in a useful direction (e.g., towards the road as opposed to the sky).

Figure 23:
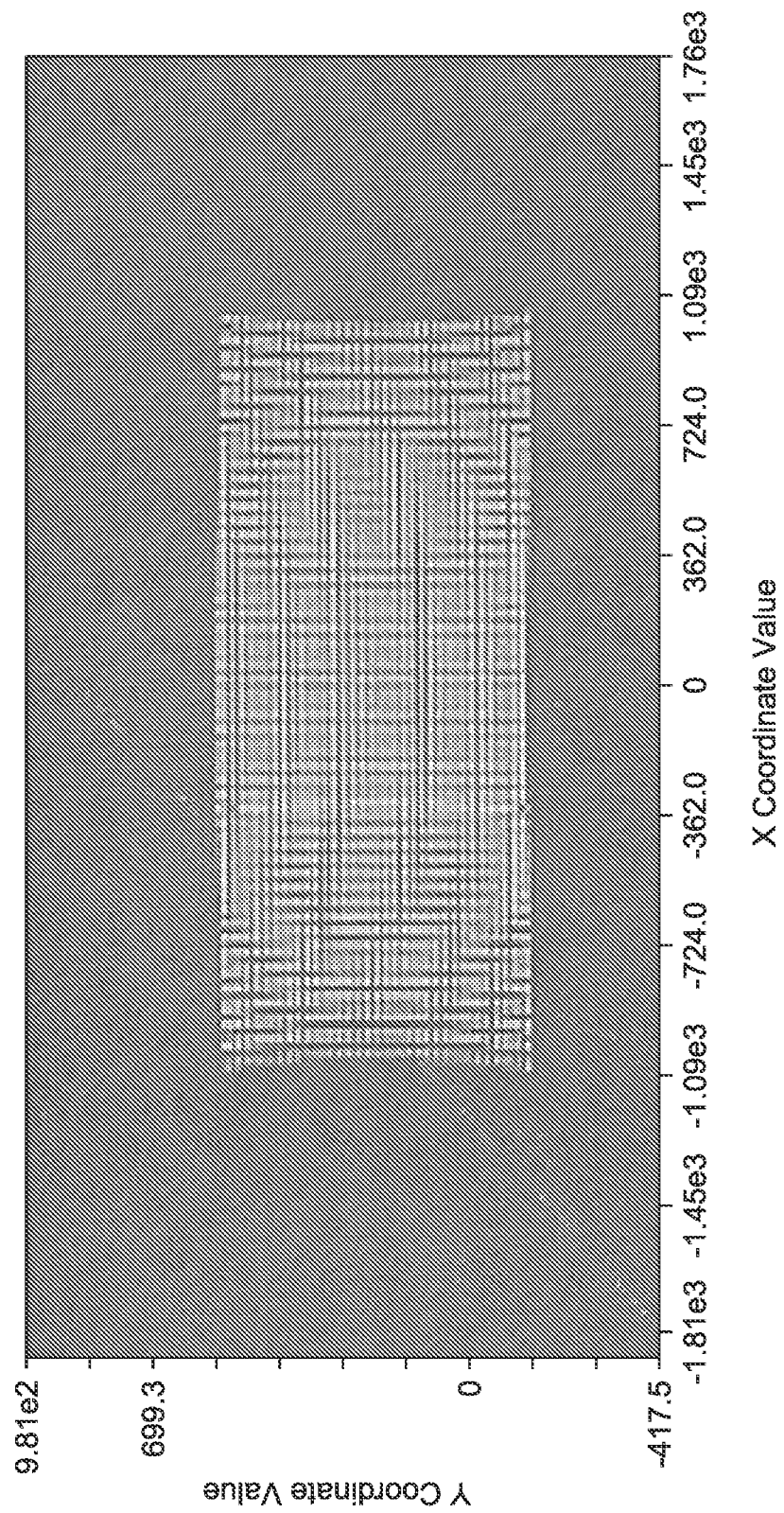
FIG. 23 depicts a point map using the polygon of FIG. 22 according to an embodiment.

FIG. 23 depicts a point map using polygon 2200 of FIG. 22. The point map includes two channels (e.g., two light source outputs and two light detectors). The scanned pattern has vertical overlap and no curve in the vertical direction.

Figure 24:
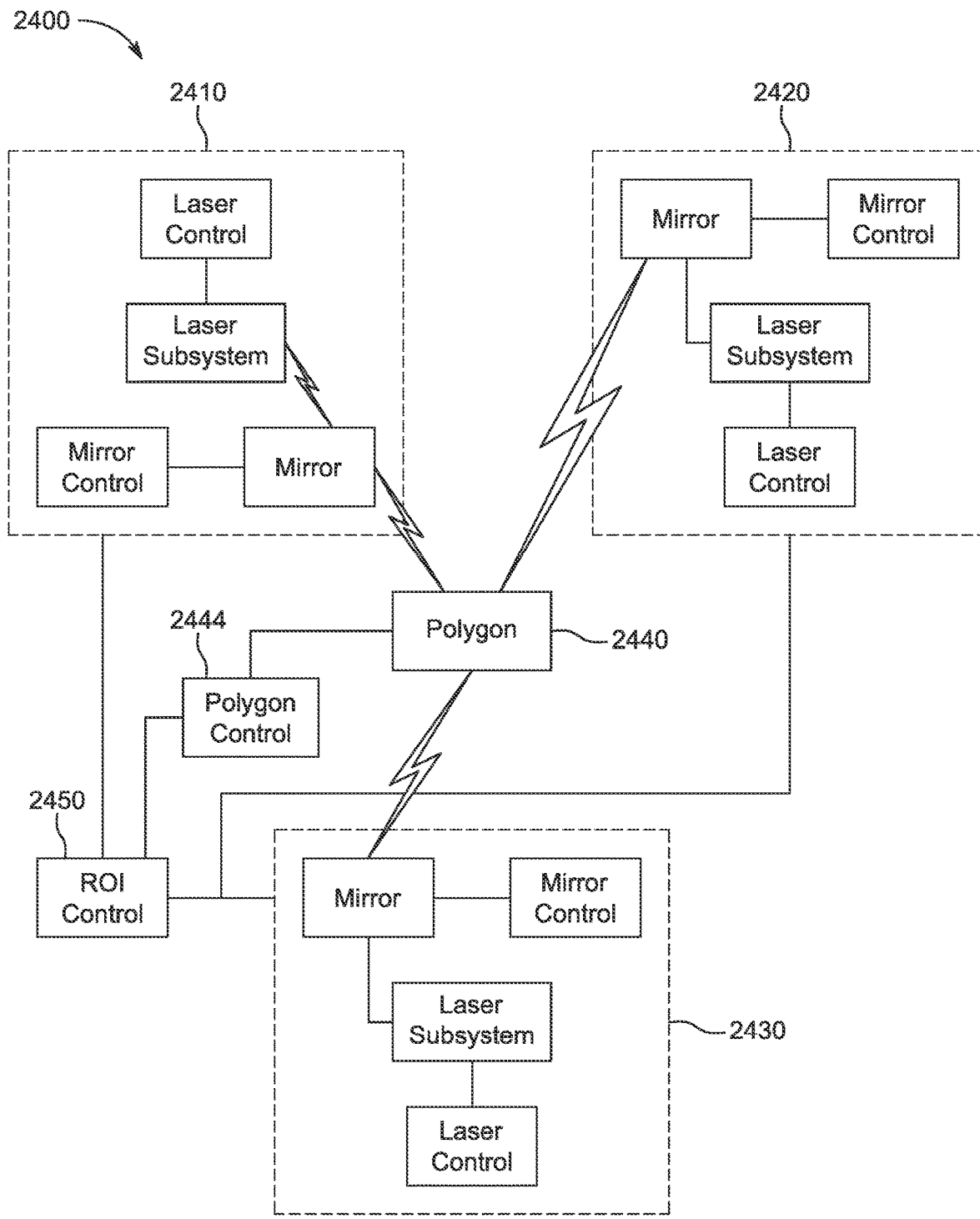
FIG. 24 shows an illustrative block diagram of a LiDAR system according to an embodiment.

FIG. 24 shows an illustrative block diagram of LiDAR system 2400 according to an embodiment. LiDAR system 2400 is similar to system 1300 of FIG. 24, but includes additional components to extend the field of view. Whereas system 1300 may provide 120 degrees of horizontal view, system 2400 may provide 360 degrees of horizontal view. System 2400 can include first subsystem 2410, second subsystem 2420, third subsystem 2430, polygon 2440, polygon control 2444, and ROI controller 2450. Each of first, second, and third subsystems 2410, 2420, and 2430 may share polygon 2440 and be controlled by the same ROI controller 2450. If desired, each of subsystems 2410, 2420, and 2430 may be independently controlled by their own respective ROI controller. ROI controller may be similar to ROI controller 1340 of FIG. 13. Each of systems 2410, 2420, and 2430 can include a laser controller (e.g., similar to laser controller 1330), a laser subsystem (e.g., similar to laser subsystem 1310), a receiver system (not shown), a mirror (e.g., similar to mirror 1360), and mirror controller (e.g., similar to mirror controller 1365). LiDAR system 2400 may be contained within one or more housings. Any of the embodiments (e.g., FIGS. 1-23) discussed herein may be used in system 2400.

In the embodiments shown in FIG. 24, each of subsystems 2410, 2420, and 2430 can be responsible for observing a different portion (e.g., a particular 120 degree portion) of a 360 degree field of view. The observed portions for each subsystem may or may not overlap. Each subsystem can be independently controlled to focus on ROI(s) in their respective FOVs. In other embodiments, four subsystems may be used (as opposed to three subsystems), each of the four subsystem may be responsible for observing a 90 degree portion of the 360 degree field of view. The observed portions for all four subsystems may or may not overlap. In yet other embodiments, five of more subsystems may be used.

Figure 25A:
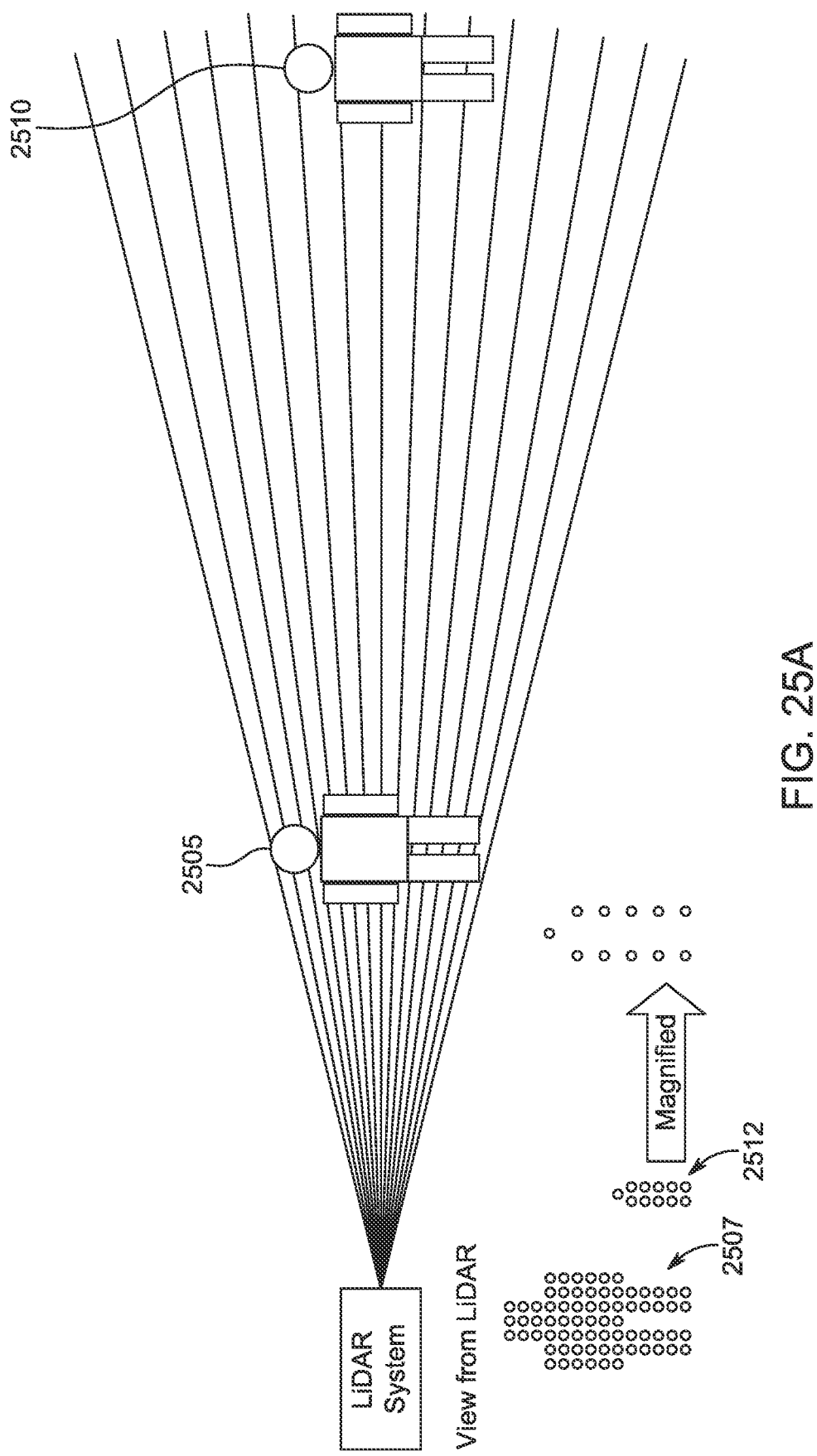
FIG. 25A and FIG. 25B show different resolutions of data points being captured from objects.

As discussed above, the LiDAR system can control the vertical and horizontal angular resolution of the light beams being projected by the scanning system. The angular resolution determines how many points can be observed from an object at a certain distance. To reiterate, the vertical angular resolution is defined by the vertical angle between adjacent light beam projections. As the vertical angle decreases, the separation between adjacent light beams is decreased, thereby resulting in more data points (or increased angular resolution). As the angle between adjacent light beams increases, the separation between adjacent light beams is increased, thereby resulting in fewer data points (or decreased angular resolution). It may be desirable to acquire more data points for objects that are relatively far away than for objects that are relatively close. See, for example, FIG. 25A, which shows close object 2505 and far object 2510 and the illustrative data points captured from both objects. The vertical angular resolution in FIG. 25A is constant across the entire vertical FOV. Close object data points 2507 correspond to data points obtained from close object 2505 and far object data points 2512 correspond to data points obtained from far object 2510. As shown, the data points collected for far object 2510 are relatively sparse compared to data points collected for close object 2505.

Figure 25B:
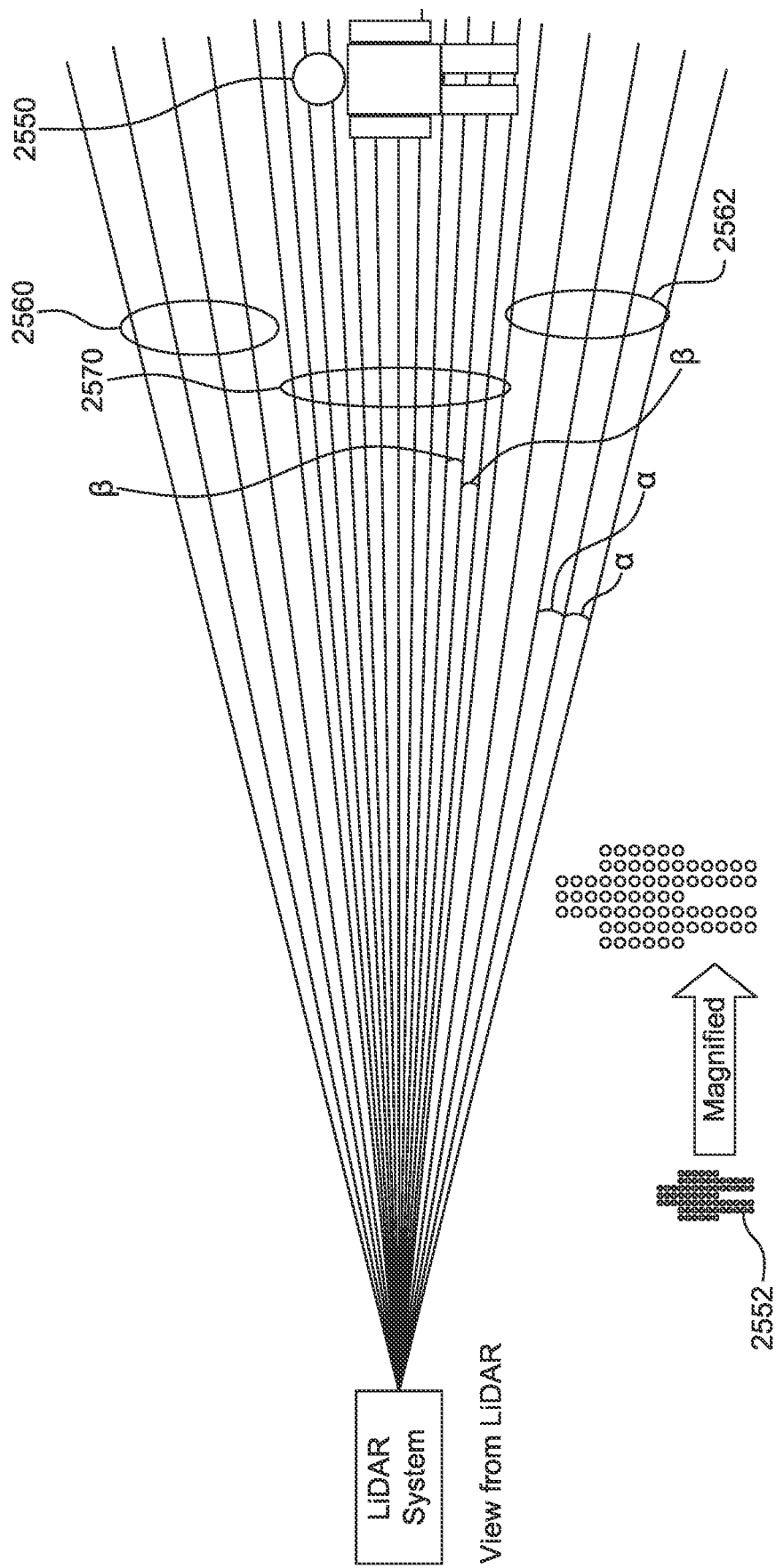

FIG. 25B shows an illustrative scenario where the angular resolution is variable across the vertical FOV. In particular, for regions 2560 and 2562, the vertical angle delta is $\alpha$ and for region 2570, the vertical angle delta is β, where β is less than α. Far object data points 2552 correspond to far object 2550. As compared to FIG. 25, the number of data points collected from the far object is greater when the angular resolution is increased such that density of light beams, and corresponding number of data points being collected, is increased. It should be understood that although FIGS. 25A and 25B show angular resolution in the vertical FOV, angular resolution may also occur in the horizontal FOV. The total number of data points that can be obtained are constrained by design constraints of the LiDAR system. Therefore, it is desirable to optimize the angular resolution for a given LiDAR system for one or more ROI(s).

The LiDAR system generally does not have a priori knowledge of the object(s) it is trying to detect, but certain assumptions can be made, and based on these assumptions, the angular resolution can be customized for different portions of the FOV. For example, the angular resolution may be customized for ROI(s) and/or assumption exceptions. In a vehicle context, the center FOV may have the highest probability of containing a relevant object at distance. For example, in the vertical context, below the center FOV focuses on the ground, and above the center FOV focuses on the sky. Thus, the center vertical FOV is more desirable for improved angular resolution. In the horizontal FOV context, left and right focusing is generally irrelevant at large distances. There may be exceptions as to where improved angular resolution is primarily focused on the center FOV. Such exceptions may occur when the vehicle is turning, driving on a curved road, driving up and down hills, or any other suitable situation where the center FOV is not the ideal ROI.

Figure 26A:
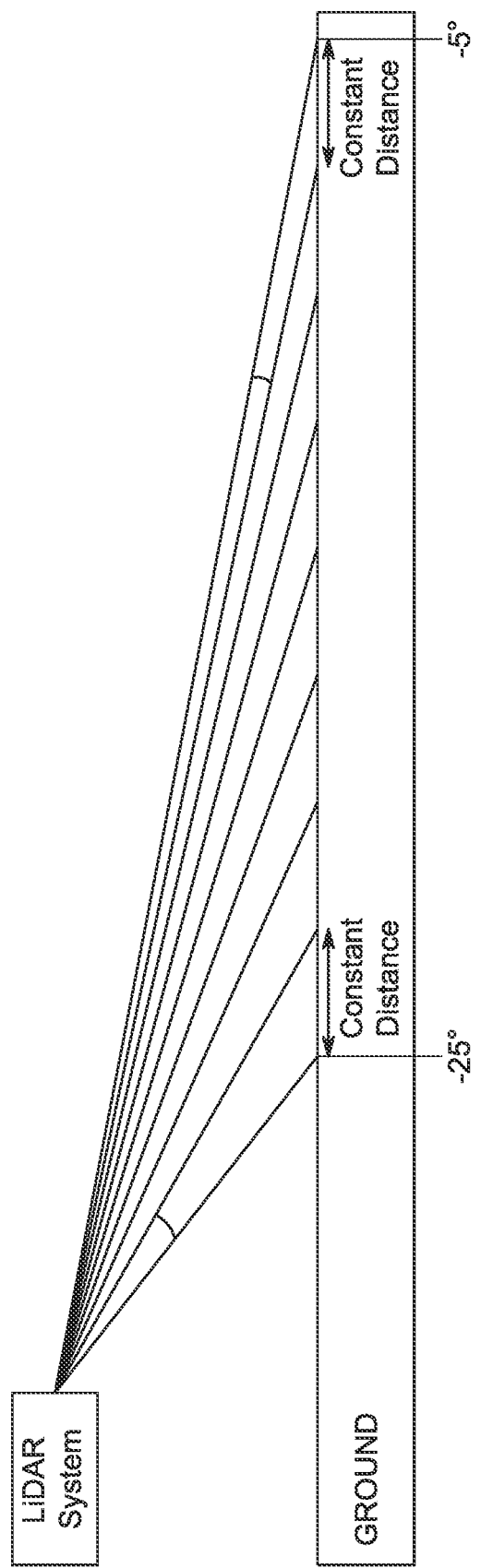
FIG. 26A shows an illustrative optimized angular resolution in a vertical FOV with respect to the ground according to an embodiment.
Figure 26B:
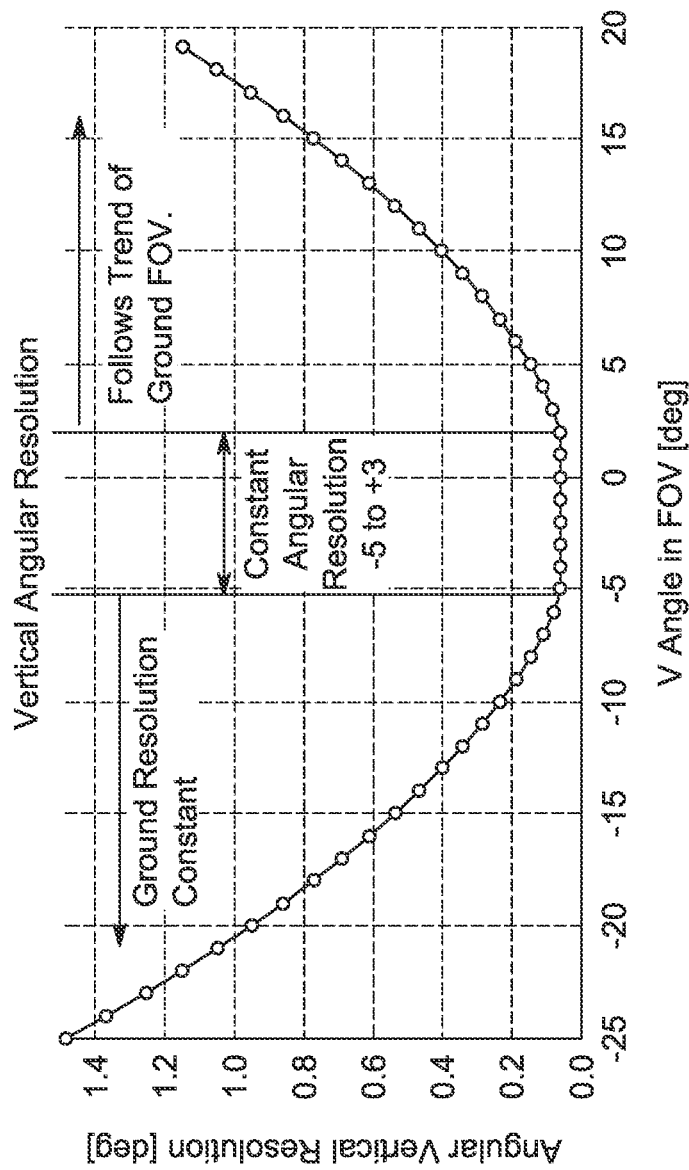
FIG. 26B shows an illustrative graph of a continuously changing angular vertical resolution as a function of the vertical angle in the FOV according to an embodiment.

FIG. 26A shows an illustrative optimized angular resolution in a vertical FOV with respect to the ground according to an embodiment. FIG. 26B shows an illustrative graph of angular vertical resolution as a function of the vertical angle in the FOV according to an embodiment. As shown in FIG. 26B, the angular vertical resolution is variable between vertical angels of −25 degrees and −5 degrees, constant between vertical angles of −5 and 3 degrees, and variable between vertical angles of 3 and 19 degrees. The variation in the angular resolution between −25 and −5 degrees is such that the ground distance between each adjacent light beam is substantially constant, as shown in FIG. 26A. The constant distance in between adjacent light pulses is possible by continuously varying the angular resolution. As discussed above, the angular resolution can be controlled by varying the movement speed of the mirror (e.g., mirror 1360). As shown in FIGS. 26A and 26B, the delta angle between adjacent light pulses increases in proportion to its relative angle away from the zero vertical angle. For example, at −25 degrees, The delta angle within the center region (e.g., shown as −5 to 3 degrees) is constant and represents the smallest angle difference between adjacent light pulses throughout the entire vertical FOV. The angular resolution of the vertical angles above 3 degrees may be continuously variable in same manner as the angular resolution for the vertical angles below −5 degrees. It should be appreciated that the numbers used in FIG. 26B are merely illustrative and that ranges for the variable angular values and the constant angular values may be different than that shown and described.

Figure 27:
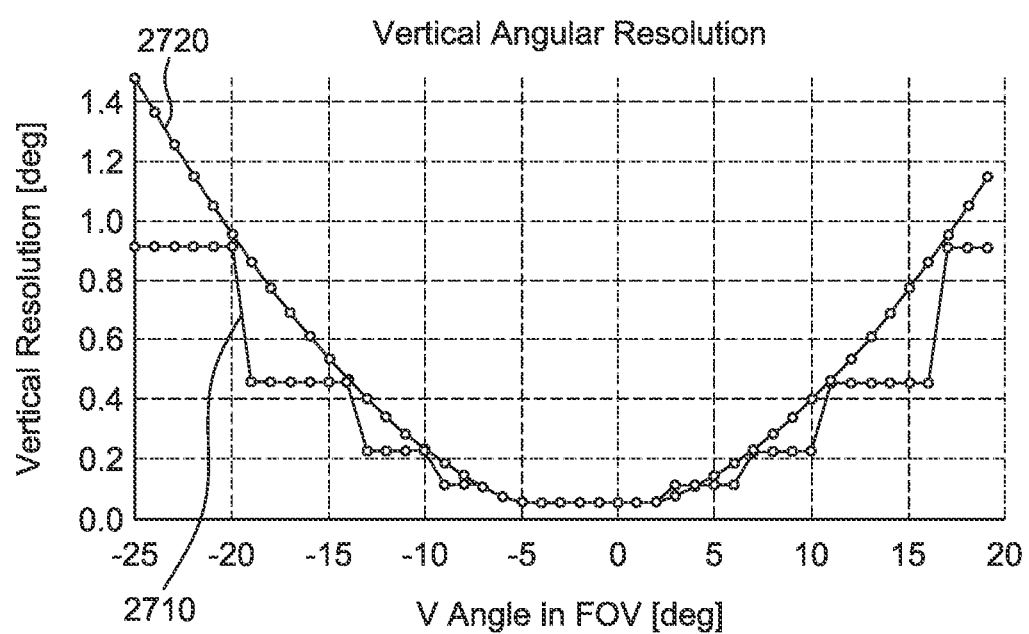
FIG. 27 shows an illustrative graph of step changing angular vertical resolution as a function of the vertical angle in the FOV according to an embodiment.

FIG. 27 shows an illustrative graph of step changing angular vertical resolution as a function of the vertical angle in the FOV according to an embodiment. Both step change vertical resolution line 2710 and continuous vertical resolution line 2720 are shown for comparison purposes. Step change vertical resolution line 2710 shows that the vertical resolution remains fixed for a fixed range of vertical angles in FOV before changing to a different vertical resolution. Step change vertical resolution line 2710 may be easier to implement than continuous vertical resolution line 2720.

Implementation of the variable and constant angular resolution may be performed using the embodiments described above in connection with FIGS. 1-24 or any other system capable of adjusting the angular resolution. For example, the mirror speed can be variably adjusted to yield angular resolution angles of FIGS. 26B and 27.

Figure 28:
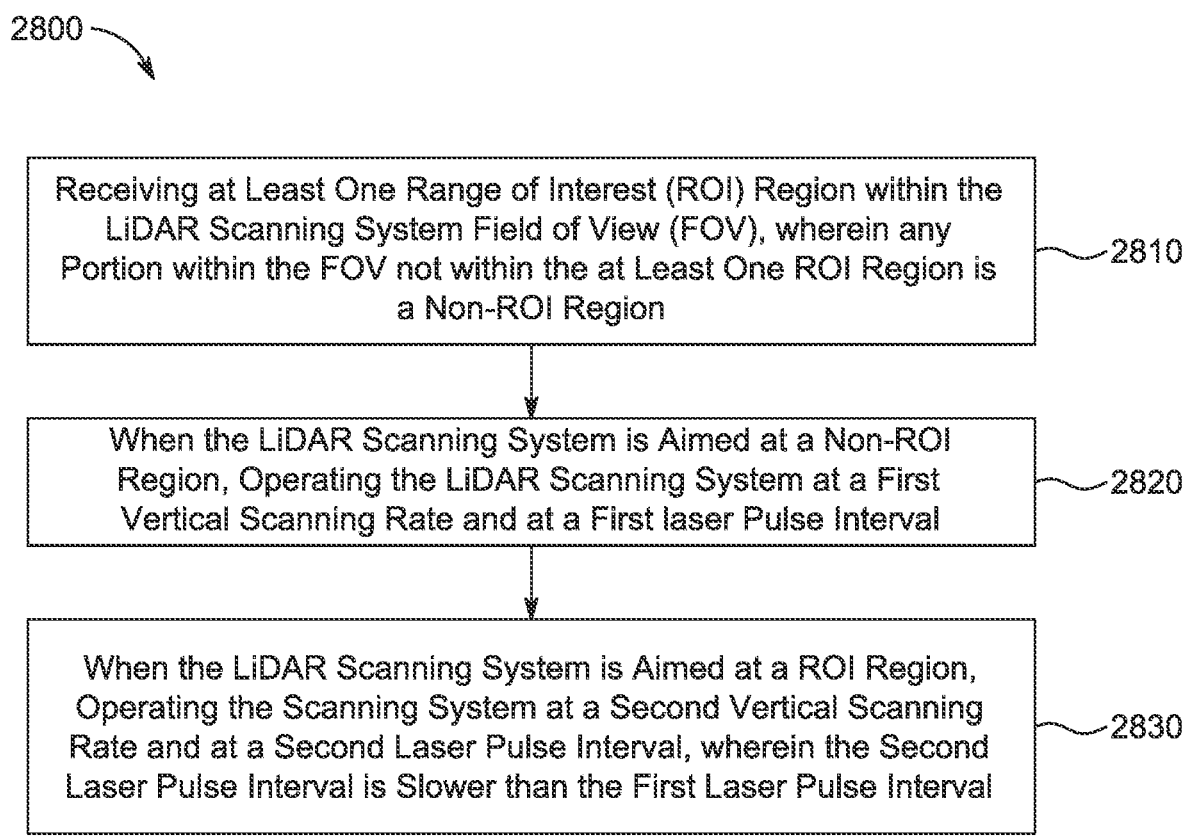
FIGS. 28-30 show different illustrative processes for handing ROIs according to various embodiments.

FIG. 28 shows illustrative process 2800 for handing ROIs according to an embodiment. Process 2800 may be implemented in a system such as system 1300 as discussed above. Starting at step 2810, at least one range of interest (ROI) region can be received within the LiDAR scanning system field of view (FOV), wherein any portion within the FOV not within the at least one ROI region is a non-ROI region or a region of non-interest. For example, a controller such as ROI controller 1340 may receive an indication of the ROIs. As a specific example, dense regions and sparse regions within the FOV may be provided or programmed to the ROI controller to specify ROIs and non-ROIs. The LiDAR scanning system directs light pulses to the FOV in a controlled manner by scanning across each horizontal row according the horizontal boundary of the FOV for multiple rows that comprise the vertical boundary of the FOV.

When the LiDAR scanning system is aimed at a non-ROI region, the LiDAR scanning system can be operated at a first vertical scanning rate and at a first laser pulse interval (as indicated by step 2820). When the LiDAR scanning system is aimed at a ROI region, the scanning system can operate at a second vertical scanning rate and at a second a second laser pulse interval (as indicated by step 2830). The second laser pulse interval can be slower than the first laser pulse interval.

It should be understood that the steps shown in FIG. 28 are merely illustrative and that additional steps may be added or existing steps may be omitted.

Figure 29:
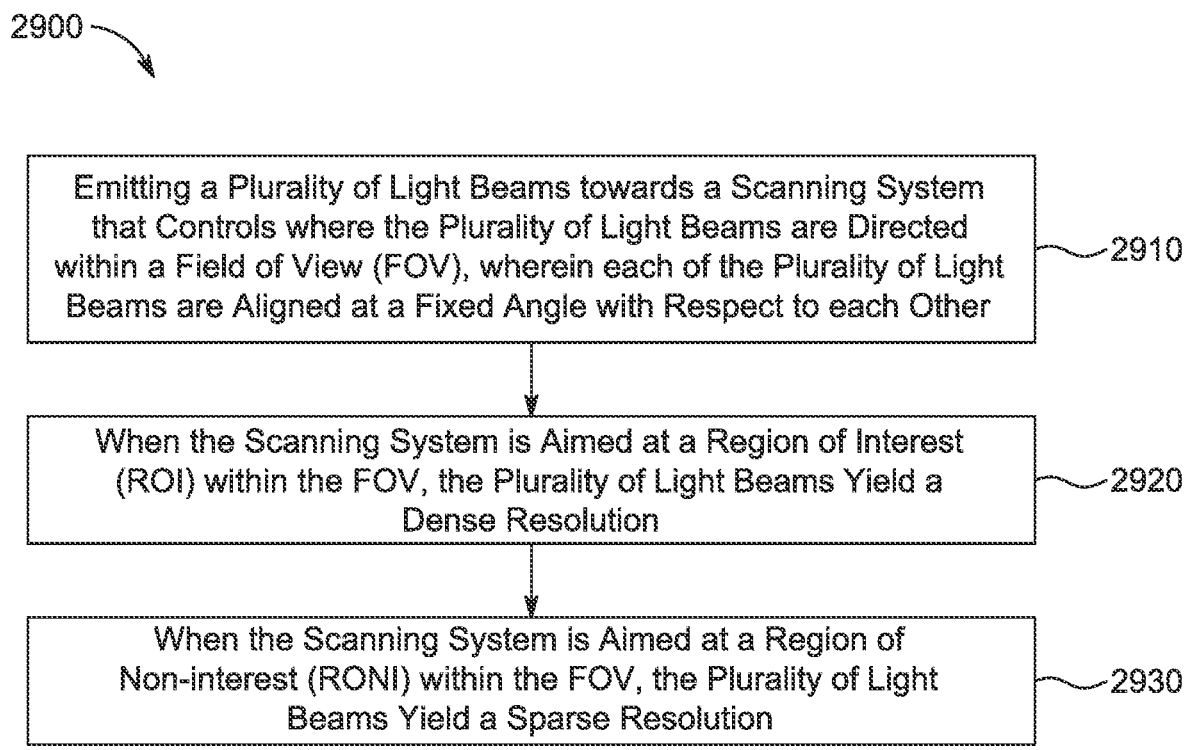

FIG. 29 shows illustrative process 2900 for handing ROIs according to an embodiment. Starting at step 2910, a plurality of light beams can be emitted towards a scanning system that controls where the plurality of light beams are directed within a field of view (FOV). For example, two or more light beams may be directed to the FOV. Each of the plurality of light beams are aligned at a fixed angle with respect to each other. At step 2920, when the scanning system is aimed at a region of interest (ROI) within the FOV, the plurality of light beams can yield a dense resolution. For example, the dense region is shown in FIG. 16 and FIG. 17A. At step 2930, when the scanning system is aimed at a region of non-interest (RONI) within the FOV, the plurality of light beams can yield a sparse resolution (as illustrated in FIGS. 16 and 17A).

It should be understood that the steps shown in FIG. 29 are merely illustrative and that additional steps may be added or existing steps may be omitted.

Figure 30:
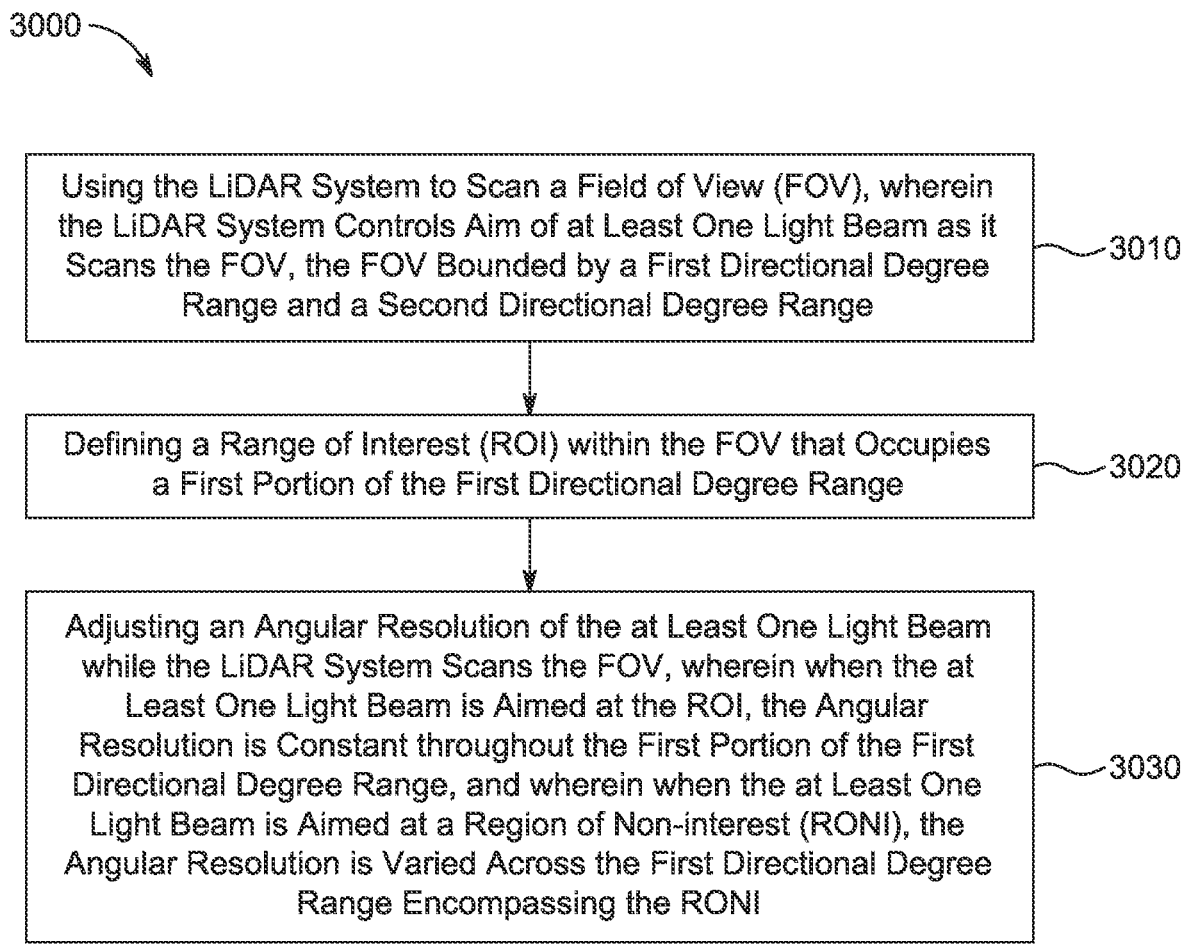

FIG. 30 shows illustrative process 3000 for handing ROIs according to an embodiment. Starting at step 3010, the LiDAR system can be used to scan a field of view (FOV). The LiDAR system controls aim of at least one light beam as it scans the FOV, and the FOV can be bounded by a first directional degree range (e.g., vertical angles) and a second directional degree range (e.g., horizontal angles). At step 3020, a range of interest (ROI) is defined within the FOV that occupies a first portion of the first directional degree range. At step 3030, an angular resolution of the at least one light beam can be adjusted while the LiDAR system scans the FOV, wherein when the at least one light beam is aimed at the ROI, the angular resolution is constant throughout the first portion of the first directional degree range, and wherein the wherein when the at least one light beam is aimed at a region of non-interest (RONI), the angular resolution is varied across the first directional degree range encompassing the RONI.

It should be understood that the steps shown in FIG. 30 are merely illustrative and that additional steps may be added or existing steps may be omitted.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-30, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system for use with a vehicle, comprising:
 a transmitter comprising:
  a plurality of semiconductor based light emitters configured to generate light energy, and
  one or more collimators that collimate the generated light energy,
  wherein the transmitter is configured to direct the generated light energy along a plurality of different angles, the combination of the plurality of different angles forming a subset of the entire vertical angle range of a field of view of the LiDAR system;
 a receiver configured to receive light energy reflected from an object within the field of view of the LiDAR system;
 a polygon structure that defines a horizontal angle range of the field of view of the LiDAR system;
 one or more mirrors configured to redirect light energy passing between the transmitter and the polygon structure, and to redirect light energy passing between the polygon structure and the receiver; and
 a region of interest (ROI) controller configured to:
  turn off at least one semiconductor based light emitter of the plurality of semiconductor based light emitters when scanning an area outside of a region of interest such that the LiDAR system has a different vertical angle scan resolution within the region of interest than the area outside of the region of interest.

2. The LiDAR system of claim 1, wherein the one or more mirrors comprise at least one fixed mirror.

3. The LiDAR system of claim 1, wherein the ROI controller is configured to adjust light pulse intervals such that the LiDAR system has a different horizontal angle scan resolution within the region of interest from the area outside of the region of interest.

4. The LiDAR system of claim 3, wherein the ROI controller is configured to adjust light pulses generated by the transmitter such that a circle size of the light pulses inside the region of interest is smaller than a circle size of the light pulses outside of the region of interest.

5. The LiDAR system of claim 1, wherein the transmitter is configured to direct the generated light energy along the plurality of different angles such that the light energy travels in a plurality of light emission paths, each light emission path of the plurality of light emission paths being associated with a semiconductor based light emitter of the plurality of semiconductor based light emitters.

6. The LiDAR system of claim 5, wherein the plurality of light emission paths are aligned such that a fixed angle exists between any two immediately adjacent light emission paths.

7. The LiDAR system of claim 1, wherein the receiver comprises a plurality of detectors, each detector of the plurality of detectors is configured to receive reflected light energy formed based on a corresponding semiconductor based light emitter of the plurality of semiconductor based light emitters.

8. The LiDAR system of claim 1, wherein the polygon structure comprises a trapezoidal cross-section in which a first facet is not parallel to a second facet.

9. The LiDAR system of claim 8, wherein the trapezoidal cross-section produces a scanned pattern having vertical overlap but that is substantially flat in a vertical direction.

10. The LiDAR system of claim 1, wherein the polygon structure is configured to rotate about a rotational axis in a first direction at a substantially constant speed.

11. The LiDAR system of claim 1, wherein a rotation axis of the polygon structure is coincident to a symmetric axis of the polygon structure.

12. The LiDAR system of claim 11, wherein the rotation axis is not in line with gravity.

13. The LiDAR system of claim 1, wherein the polygon structure is masked.

14. The LiDAR system of claim 1, wherein the polygon structure is trimmed to include chamfers to improve operation.

* * * * *